(12) United States Patent
Taguchi et al.

(10) Patent No.: US 7,565,487 B2
(45) Date of Patent: Jul. 21, 2009

(54) COMPUTER SYSTEM FOR MANAGING DATA AMONG VIRTUAL STORAGE SYSTEMS

(75) Inventors: Yuichi Taguchi, Sagamihara (JP); Fumi Fujita, Fujisawa (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 11/447,503

(22) Filed: Jun. 5, 2006

(65) Prior Publication Data

US 2007/0245101 A1  Oct. 18, 2007

(30) Foreign Application Priority Data

Apr. 12, 2006  (JP)  ............................. 2006-109367

(51) Int. Cl.
*G06F 12/00* (2006.01)
*G06F 13/00* (2006.01)
*G06F 13/28* (2006.01)

(52) U.S. Cl. ....................................... 711/114; 718/105
(58) Field of Classification Search ........................ None
See application file for complete search history.

(56) References Cited

U.S. PATENT DOCUMENTS

| 7,085,883 | B1 * | 8/2006 | Dalgic et al. ................. 711/114 |
| 2004/0068561 | A1 | 4/2004 | Yamamoto et al. |
| 2004/0257857 | A1 | 12/2004 | Yamamoto et al. |
| 2005/0193167 | A1 | 9/2005 | Eguchi et al. |
| 2006/0112247 | A1 * | 5/2006 | Ramany et al. ............. 711/165 |

* cited by examiner

*Primary Examiner*—Kevin L Ellis
*Assistant Examiner*—Chad L Davidson
(74) *Attorney, Agent, or Firm*—Townsend and Townsend and Crew LLP

(57) ABSTRACT

A management computer includes a management unit for managing the load of the virtual storage extent and the threshold value thereof in the virtual storage subsystems for each prescribed period; and a migration command unit for commanding, when the load of the virtual storage extent managed by the management unit exceeds the threshold value and with the virtual storage extent as the virtual storage extent to be migrated, the migration of the virtual storage extent to be migrated to another virtual storage subsystem that is mutually communicable with a host computer provided with the virtual storage extent to be migrated and a storage subsystem having the storage extent associated with the virtual storage extent to be migrated; and wherein the virtual storage subsystem includes a migration unit for migrating the virtual storage extent to be migrated commanded by the migration command unit to the other virtual storage subsystem.

15 Claims, 36 Drawing Sheets

FIG.12

| APPARATUS IDENTIFICATION NUMBER | DATA I/O NETWORK INTERFACE NUMBER | PHYSICAL STORAGE EXTENT IDENTIFICATION NUMBER | MAGNETIC DISK IDENTIFICATION NUMBER |
|---|---|---|---|
| SN201 (201) | 50:06:0A:0B:0C:0D:24:01 (2401) | 00:0A (211) | HDD001-004 |
| SN201 (201) | 50:06:0A:0B:0C:0D:24:01 (2401) | 00:0B (212) | HDD001-004 |
| SN201 (201) | 50:06:0A:0B:0C:0D:24:02 (2402) | 00:0E (215) | HDD101-108 |
| SN202 (202) | 50:06:0A:0B:0C:0D:24:03 (2403) | 00:0C (213) | HDD501-504 |
| SN202 (202) | 50:06:0A:0B:0C:0D:24:03 (2403) | 00:0D (214) | HDD501-504 |
| ... | ... | ... | ... |

FIG.13

| | VIRTUAL STORAGE EXTENT IDENTIFYING INFORMATION 51131 | | PHYSICAL STORAGE EXTENT IDENTIFYING INFORMATION 51132 | |
|---|---|---|---|---|
| APPARATUS IDENTIFICATION NUMBER | DATA I/O NETWORK INTERFACE NUMBER | VIRTUAL STORAGE EXTENT IDENTIFICATION NUMBER | DATA I/O NETWORK INTERFACE NUMBER | PHYSICAL STORAGE EXTENT IDENTIFICATION NUMBER |
| SN101 (101) | 50:06:0A:0B:0C:0D:14:01 (1401) | 0A:00 (111) | 50:06:0A:0B:0C:0D:24:01 (2401) | 00:0A (211) |
| SN101 (101) | 50:06:0A:0B:0C:0D:14:01 (1401) | 0B:00 (112) | 50:06:0A:0B:0C:0D:24:01 (2401) | 00:0B (212) |
| SN102 (102) | 50:06:0A:0B:0C:0D:14:02 (1402) | 0E:00 (115) | 50:06:0A:0B:0C:0D:24:02 (2402) | 00:0E (215) |
| SN103 (103) | 50:06:0A:0B:0C:0D:14:06 (1406) | 0C:00 (113) | 50:06:0A:0B:0C:0D:24:03 (2403) | 00:0C (213) |
| SN103 (103) | 50:06:0A:0B:0C:0D:14:06 (1406) | 0D:00 (114) | 50:06:0A:0B:0C:0D:24:03 (2403) | 00:0D (214) |
| ... | ... | ... | ... | ... |

| APPARATUS IDENTIFICATION NUMBER (51011) | DATA I/O NETWORK INTERFACE NUMBER (51012) | CONNECTION DESTINATION APPARATUS IDENTIFICATION NUMBER (51013) | CONNECTION DESTINATION DATA I/O NETWORK INTERFACE NUMBER (51014) |
|---|---|---|---|
| SN401 (401) | 50:06:0A:0B:0C:0D:44:01 (4401) | SN301 (301) | 50:06:0A:0B:0C:0D:34:01 |
| SN401 (401) | 50:06:0A:0B:0C:0D:44:02 (4402) | SN301 (301) | 50:06:0A:0B:0C:0D:34:02 |
| SN401 (401) | 50:06:0A:0B:0C:0D:44:03 (4403) | SN101 (101) | 50:06:0A:0B:0C:0D:14:01 (1401) |
| SN402 (402) | 50:06:0A:0B:0C:0D:44:04 (4404) | SN302 (302) | 50:06:0A:0B:0C:0D:34:03 |
| SN402 (402) | 50:06:0A:0B:0C:0D:44:05 (4405) | SN102 (102) | 50:06:0A:0B:0C:0D:14:02 (1402) |
| SN402 (402) | 50:06:0A:0B:0C:0D:44:06 (4406) | SN302 (302) | 50:06:0A:0B:0C:0D:34:04 |
| SN402 (402) | 50:06:0A:0B:0C:0D:44:08 (4408) | SN103 (103) | 50:06:0A:0B:0C:0D:14:06 |
| SN402 (402) | 50:06:0A:0B:0C:0D:44:09 (4409) | SN102 (102) | 50:06:0A:0B:0C:0D:14:08 (1408) |
| SN403 (403) | 50:06:0A:0B:0C:0D:44:11 (4411) | SN101 (101) | 50:06:0A:0B:0C:0D:14:03 (1403) |
| SN403 (403) | 50:06:0A:0B:0C:0D:44:12 (4412) | SN102 (102) | 50:06:0A:0B:0C:0D:14:04 (1404) |
| SN403 (403) | 50:06:0A:0B:0C:0D:44:13 (4413) | SN201 (201) | 50:06:0A:0B:0C:0D:24:01 (2401) |
| SN403 (403) | 50:06:0A:0B:0C:0D:44:14 (4414) | SN201 (201) | 50:06:0A:0B:0C:0D:24:02 (2402) |
| SN403 (403) | 50:06:0A:0B:0C:0D:44:15 (4415) | SN103 (103) | 50:06:0A:0B:0C:0D:14:07 (1407) |
| SN403 (403) | 50:06:0A:0B:0C:0D:44:16 (4416) | SN202 (202) | 50:06:0A:0B:0C:0D:24:03 (2403) |
| SN403 (403) | 50:06:0A:0B:0C:0D:44:17 (4417) | SN202 (202) | 50:06:0A:0B:0C:0D:24:04 (2404) |
| ... | ... | ... | ... |

| LOGICAL NETWORK IDENTIFICATION NUMBER 51031 | APPARATUS IDENTIFICATION NUMBER 51032 | DATA IO NETWORK INTERFACE NUMBER 51033 |
|---|---|---|
| ZONE421 (421) | SN401(401) | 50:06:0A:0B:0C:0D:44:01 (4401) |
| ZONE421 (421) | SN401(401) | 50:06:0A:0B:0C:0D:44:02 (4402) |
| ZONE421 (421) | SN401(401) | 50:06:0A:0B:0C:0D:44:03 (4403) |
| ZONE422 (422) | SN402(402) | 50:06:0A:0B:0C:0D:44:04 (4404) |
| ZONE422 (422) | SN402(402) | 50:06:0A:0B:0C:0D:44:05 (4405) |
| ZONE422 (422) | SN402(402) | 50:06:0A:0B:0C:0D:44:06 (4406) |
| ZONE422 (422) | SN402(402) | 50:06:0A:0B:0C:0D:44:08 (4408) |
| ZONE423 (423) | SN403(403) | 50:06:0A:0B:0C:0D:44:11 (4411) |
| ZONE423 (423) | SN403(403) | 50:06:0A:0B:0C:0D:44:13 (4413) |
| ZONE423 (424) | SN403(403) | 50:06:0A:0B:0C:0D:44:12 (4412) |
| ZONE423 (424) | SN403(403) | 50:06:0A:0B:0C:0D:44:14 (4414) |
| ZONE424 (425) | SN403(403) | 50:06:0A:0B:0C:0D:44:15 (4415) |
| ZONE424 (425) | SN403(403) | 50:06:0A:0B:0C:0D:44:16 (4416) |
| ... | ... | ... |

| APPARATUS IDENTIFICATION NUMBER (51151) | DATA I/O NETWORK INTERACE IDENTIFYING INFORMATION (51152) | DATA I/O NETWORK INTERFACE BUSY RATE (51153) |
|---|---|---|
| SN101(101) | 50:06:0A:0B:0C:0D:14:01 (1401) | 20% |
| SN101(101) | 50:06:0A:0B:0C:0D:14:03 (1403) | 15% |
| SN102(102) | 50:06:0A:0B:0C:0D:14:02 (1402) | 60% |
| SN102(102) | 50:06:0A:0B:0C:0D:14:04 (1404) | 20% |
| SN102(102) | 50:06:0A:0B:0C:0D:14:08 (1408) | 0% |
| SN102(103) | 50:06:0A:0B:0C:0D:14:06 (1406) | 90% |
| SN102(103) | 50:06:0A:0B:0C:0D:14:07 (1407) | 60% |
| ... | ... | |

| APPARATUS IDENTIFICATION NUMBER (51191) | VIRTUAL STORAGE EXTENT IDENTIFICATION NUMBER (51192) | DATA I/O NETWORK INTERFACE BUSY RATE THRESHOLD VALUE (51193) |
|---|---|---|
| SN101(101) | 0A:00 (111) | 80% |
| SN101(101) | 0B:00 (112) | 60% |
| SN102(102) | 0E:00 (115) | 40% |
| SN103(103) | 0D:00 (114) | 50% |
| ... | ... | ... |

| APPARATUS IDENTIFICATION NUMBER (51211) | HOST COMPUTER STORAGE EXTENT IDENTIFYING INFORMATION (51212) | DATA I/O NETWORK INTERFACE NUMBER (51213) | STORAGE EXTENT IDENTIFYING INFORMATION (51214) |
|---|---|---|---|
| SN301(301) | 0A(311) | 50:06:0A:0B:0C:0D:14:01 (1401) | 0A:00 (111) |
| SN301(301) | 0B(312) | 50:06:0A:0B:0C:0D:14:01 (1401) | 0B:00 (112) |
| SN302(302) | 0C(313) | 50:06:0A:0B:0C:0D:14:06 (1406) | 0C:00 (113) |
| SN302(302) | 0D(314) | 50:06:0A:0B:0C:0D:14:06 (1406) | 0D:00 (114) |
| SN302(302) | 0E(315) | 50:06:0A:0B:0C:0D:14:02 (1402) | 0E:00 (115) |
| ... | ... | ... | ... |

5121

COMPUTER SYSTEM FOR MANAGING DATA AMONG VIRTUAL STORAGE SYSTEMS

CROSS-REFERENCE TO RELATED APPLICATIONS

This application relates to and claims priority from Japanese Patent Application No. 2006-109367, filed on Apr. 12, 2006, the entire disclosure of which is incorporated herein by reference.

BACKGROUND

The present invention pertains to a computer system comprising a host computer, a virtual storage subsystem, a storage subsystem, and a management computer. In particular, the present invention relates to a management unit for optimally maintaining the configuration of the computer system.

(1) Storage Area Network

A computer system where one or more external storage apparatuses and one or more host computers are connected via a Storage Area Network (SAN) and a plurality of host computers share high-capacity storage apparatuses configured from one or more external storage apparatuses is becoming widely prevalent. With this kind of computer system, there is an advantage in that it is easy to add delete or exchange the memory resource or computer resource, and that it is superior in extensibility. A storage subsystem configured in RAID (Redundant Array of Independent Disks) is generally used as the external storage apparatus to be connected to the SAN.

(2) Fibre Channel Zoning

Further, a fibre channel switch configuring the SAN provides a zoning function, which is a logical partitioning unit of a fibre channel network. One mode of fibre channel zoning configures one zone with an aggregate of network interfaces, The network interfaces registered in the zone do not accept the data transfer with a network interface that is not registered in the zone. In other words, data transfer is enabled only among the network interfaces registered in the zone.

(3) Hierarchical Storage System

Japanese Patent Laid Open Publication No. 2005-011277 (Patent Document 1) proposes a computer system capable of alleviating the load of one's own virtual storage subsystem by connecting a virtual storage subsystem to an external storage subsystem having another storage extent, and providing to a host computer the storage extent in such other storage subsystem as a virtual storage extent of one's own virtual storage subsystem.

Further, Japanese Patent Laid-Open Publication No. 2005-242690 (Patent Document 2) proposes a computer system wherein a storage extent provided by an external storage subsystem is defined as a virtual storage extent of one's own virtual storage subsystem so as to relay all I/O processing request from a host computer. During the relay, the I/O processing status is monitored and, when there is an external storage subsystem with a high load, the operational status of the port and processor is confirmed. When the load can be suppressed by changing the configuration thereof, such change Is performed, and, when it is not possible to suppress the load by changing the configuration, data is migrated from the virtual storage extent with a high load to a more available virtual storage extent, or from the storage extent with a high load to a more available storage extent.

Moreover, Japanese Patent Laid-Open Publication No. 2004-127141 (Patent Document 3) proposes a computer system of acquiring information managed by the respective apparatuses from an administrator of the respective apparatuses connected to a SAN, detecting virtual storage extent mapping and real storage extent mapping in the SAN based on the acquired information, managing these, retaining an event dictionary for interpreting the contents of a failure notice message received from the respective apparatuses in the SAN, and, upon receiving a failure reception message, detecting the influence of such failure on the I/O access of the virtual storage extent, and checking the virtual storage extent creation request of the SAN administrator based on the virtual storage extent mapping information or real storage extent mapping information.

The virtual storage subsystem technology disclosed in Patent Documents 1 to 3 seeks to equalize the load by migrating a virtual storage extent with a high load to a separate virtual storage subsystem. As this virtual storage subsystem to become the, migration destination, it is necessary to select a virtual storage subsystem to which the I/O devices to be connected to the virtual storage extent to be migrated can 1i similarly be connected. Nevertheless, if the configuration of the Storage Area Network is complex, it becomes difficult to select a virtual storage subsystem that satisfies the foregoing requirement. For instance, the virtual storage subsystem of the migration destination must be selected as follows.

(1) As the virtual storage subsystem of the migration destination, it is necessary to select a virtual storage subsystem that is physically connectable to all I/O devices that were connected to the virtual storage extent to be migrated.

(2) In a case when the virtual storage subsystem has a function of partitioning a network into logical areas, as the virtual storage subsystem of the migration destination, it is necessary to select a virtual storage subsystem that is logically connectable to all I/O devices that were connected to the virtual storage extent to be migrated.

(3) When there is no virtual storage subsystem that satisfies the requirements of (1) and (2) above, it is necessary to change the network configuration so that all I/O devices that were connected to the, virtual storage extent to be migrated can be connected to the virtual storage subsystem of the migration destination.

In other words, during the process of migrating a virtual storage extent loaded in a virtual storage subsystem to a separate virtual storage subsystem, all I/O devices to be connected to such virtual storage extent must also be able to reliably connect to the virtual storage subsystem of the migration destination. Thus, in selecting the virtual storage subsystem of the migration destination, a means for selecting a virtual storage subsystem capable of guaranteeing that all I/O devices to be connected to the virtual storage extent can be connected in the physical configuration and logical configuration of the network will be required. Further, if there is no virtual storage subsystem that satisfies the foregoing requirements, a means for changing the logical network configuration so that all I/O devices can be connected to the virtual storage subsystem after migration will be required.

SUMMARY

The present invention was devised in view of the foregoing points, and proposes a computer system, a management computer, and a virtual storage subsystem capable of dramatically improving the reliability upon migrating the virtual storage extent.

In order to overcome the foregoing problems, in one aspect of the present invention, provided is a computer system comprising a plurality of storage subsystems having a storage extent for storing data sent from a plurality of host computers; a plurality of virtual storage subsystems for providing a virtual storage extent associated with the storage extent to the host computers; a first connection unit for connecting the host computers and the virtual storage subsystems; a second connection unit for connecting the virtual storage subsystems and the storage subsystems; and a management computer for managing the storage subsystems, the virtual storage subsystems, the first connection unit and the second connection unit; wherein the management computer includes a management unit for managing the load of the virtual storage extent and the threshold value thereof in the virtual storage subsystems for each prescribed period; and a migration command unit for commanding, when the load of the virtual storage extent managed by the management unit exceeds the threshold value and with the virtual storage extent as the virtual storage extent to be migrated, the migration of the virtual storage extent to be migrated to another virtual storage subsystem that is mutually communicable with a host computer provided with the virtual storage extent to be migrated and a storage subsystem having the storage extent associated with the virtual storage extent to be migrated; and wherein the virtual storage subsystem includes a migration unit for migrating the virtual storage extent to be migrated commanded by the migration command unit to the other virtual storage subsystem.

In another aspect of the present invention, provided is a management computer comprising a management unit for managing a plurality of storage subsystems having a storage extent for storing data sent from a plurality of host computers and a plurality of virtual storage subsystems for providing a virtual storage extent associated with the storage extent to the host computers, and for managing the load of the virtual storage extent and the threshold value thereof in the virtual storage subsystems for each prescribed period; and a migration command unit for commanding, when the load of the virtual storage extent managed by the management unit exceeds the threshold value and with the virtual storage extent as the virtual storage extent to be migrated, the migration of the virtual storage extent to be migrated to another virtual storage subsystem that is mutually communicable with a host computer provided with the virtual storage extent to be migrated and a storage subsystem having the storage extent associated with the virtual storage extent to be migrated.

In another aspect of the present invention, provided is a virtual storage subsystem comprising a management unit for managing the load and its threshold value of a virtual storage extent associated with a storage extent of a plurality of storage subsystems for storing data sent from a plurality of host computers for each prescribed period; and a migration command unit for commanding, when the load of the virtual storage extent managed by the management unit exceeds the threshold value and with the virtual storage extent as the virtual storage extent to be migrated, the migration of the virtual storage extent to be migrated to another virtual storage subsystem that is mutually communicable with a host computer provided with the virtual storage extent to be migrated and a storage subsystem having the storage extent associated with the virtual storage extent to be migrated.

Accordingly, since the load of the virtual storage extent will constantly be below a certain level, it is possible to maintain the data I/O performance to be above a certain level. Further, upon migrating the virtual storage extent, it is possible to guarantee the dependability of the output of data since the host computer and storage subsystem that were connected to the virtual storage extent before the migration can reliably be connected even after the migration. Moreover, since it is possible to integrate the configuration change operation of the storage subsystem and the configuration change operation of the first and second connection unit, which were conventionally conducted separately, it is possible to avoid the inconsistency of configuration and reduce management costs.

The present invention realizes a computer system, a management computer, and a virtual storage subsystem capable of dramatically improving the reliability upon migrating the virtual storage extent.

DESCRIPTION OF DRAWINGS

FIG. 12 is a conceptual diagram explaining the storage extent configuration information;

FIG. 13 is a conceptual diagram explaining the virtual storage extent configuration information;

FIG. 15 is a conceptual diagram of the physical network configuration information;

FIG. 16 is a conceptual diagram explaining the virtual storage extent configuration change condition definition information;

FIG. 17 is a conceptual diagram explaining the virtual storage extent load information;

FIG. 18 is a conceptual diagram explaining the virtual storage extent configuration change condition definition information;

FIG. 19 is a conceptual diagram explaining the host computer storage extent configuration information;

DETAILED DESCRIPTION

Embodiments of the present invention are now explained with reference to the drawings, The present invention, however, shall not be limited by the following embodiments.

Figure 1:
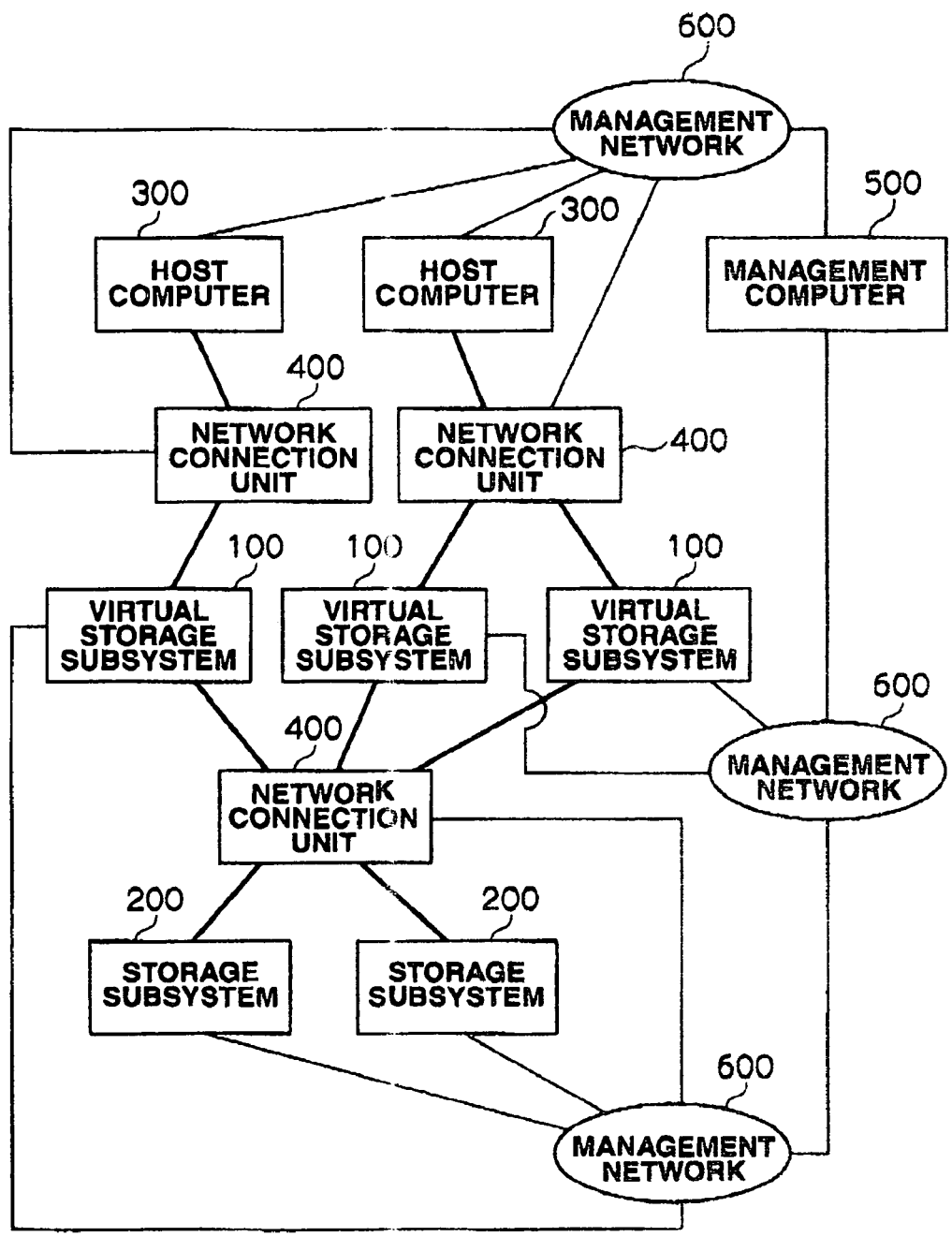
FIG. 1 is a schematic diagram showing a physical configuration of the storage network according to an embodiment of the present invention.

FIG. 1 shows a physically connected configuration example of a computer system 1 configured with a Storage Area Network adopting virtual storage subsystems. With the computer system 1, a host computer 300 for operating applications such as a database or file server and performing the input and output of data to and from a storage extent, a storage subsystem 200 loaded with a memory medium such as a hard disk and which provides a storage extent as the regional unit for storing data, and a virtual storage subsystem 100 for virtualizing the storage extent provided by the storage subsystem 200 and providing it to the host computer 300 are able to mutually input and output data by being mutually connected via a network connection unit 400.

Further, the virtual storage subsystem 100, the storage subsystem 200, the host computer 300, and the network connection unit 400 are connected to a management computer 500 via a management network 600. In this embodiment, although the data I/O network configured by the management network 600 and network connection unit 400 are formed independently, a single network may concurrently fulfill the objective of both components.

Figure 2:
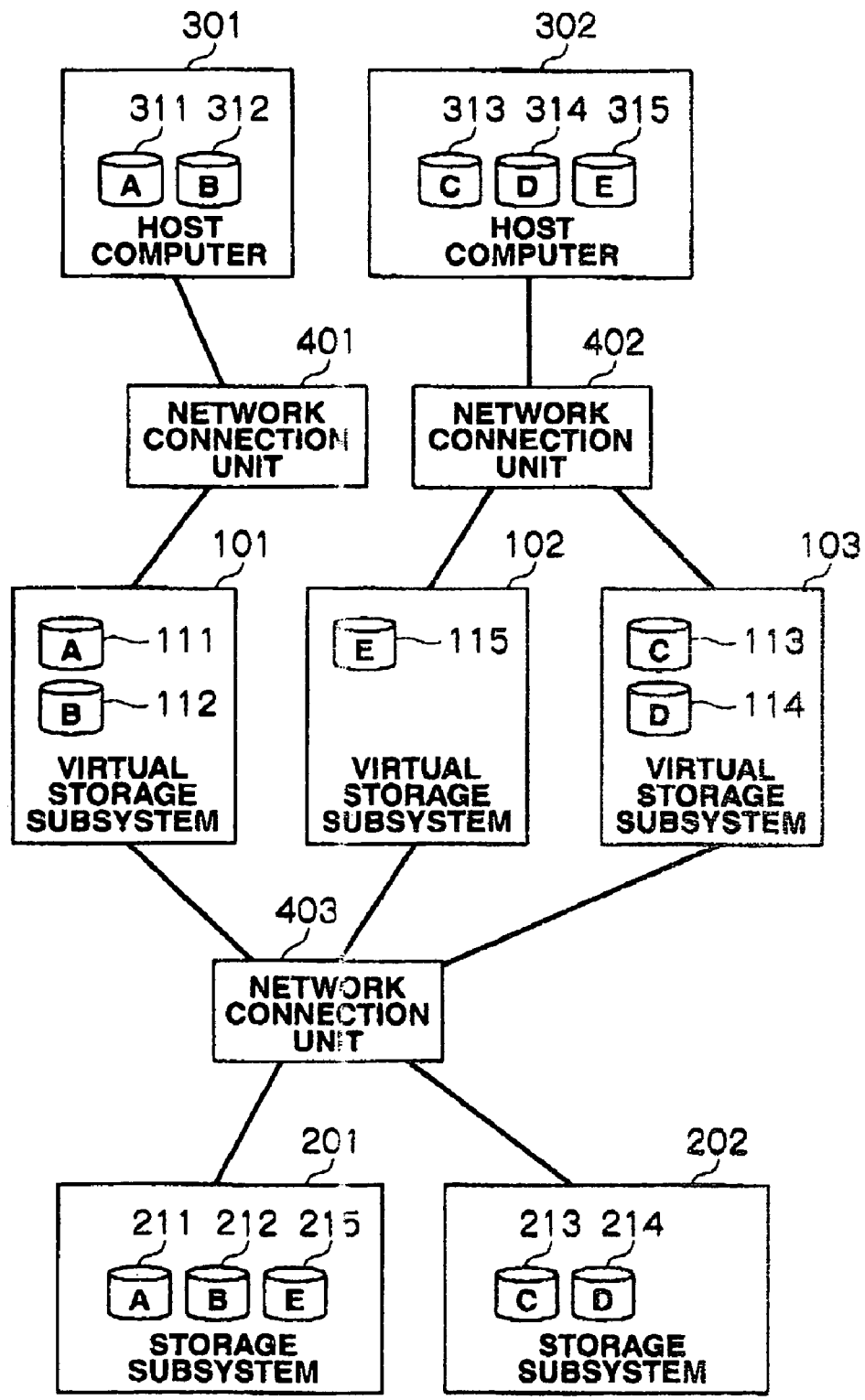
FIG. 2 is a schematic diagram showing a relationship diagram of the storage network and storage extent.

FIG. 2 shows a logical configuration example representing the relation of the virtual storage subsystem 100, the storage subsystem 200, and the host computer 300 configuring the computer system 1 illustrated in FIG. 1, and the storage extents.

The storage subsystems 201 and 202 provide storage extents 211, 212, 213, 214 215 of "A" to "E" configured from physical memory mediums. The storage extents 211, 212, 213, 214, 215 are respectively associated with virtual storage extents 111, 112, 113, 114, 115 of "A" to "E" configured by virtual storage subsystems 101, 102, 103 via a network connection unit 403. Similarly, the virtual storage subsystems 111, 112, 113, 114, 115 are associated with host computer storage extents 311, 312, 313, 314, 315 of "A" to "E" configured by host computers 301, 302 via network connection units 401, 402.

For example, a file system operated by the host computer 302 mounts the host computer storage extent 314 of "D" as a logical volume, and a data I/O application reads and writes data.

The host computer storage extent 314 of "D" is associated with the virtual storage extent 114 of "D" loaded on the virtual storage subsystem 103. In other words, the host computer 302 issues a data I/O request (SCSI command) to the virtual storage extent 114 of "D".

Figure 14:
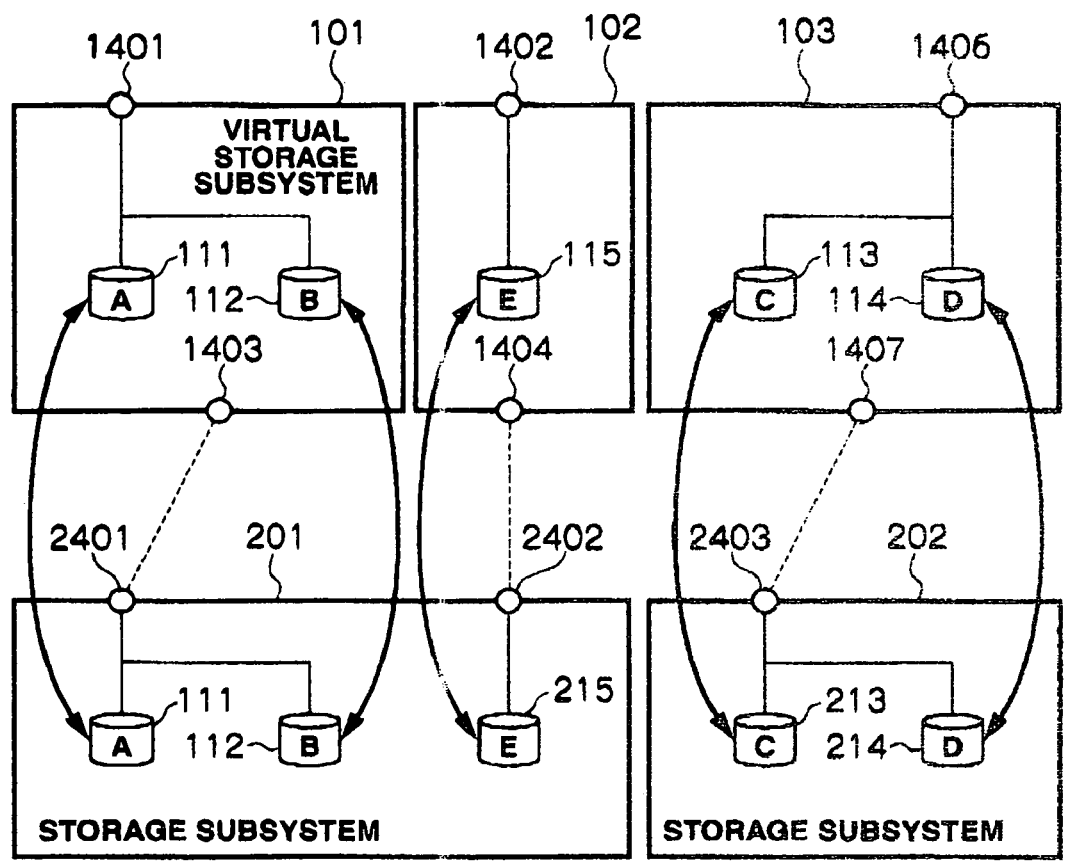
FIG. 14 is a conceptual diagram showing a relationship diagram of the storage subsystem and storage extent.

Further, the virtual storage extent 114 of "D" is associated with the storage extent 214 of "D" loaded on the storage subsystem 202. The virtual storage subsystem 103 that receives a data I/O request issued by the host computer 302 forwards the data I/O request (SCSI command) to the storage extent 214 of "D". Incidentally, relationship of the virtual storage extent and storage extent is also depicted in FIG. 14.

Figure 3:
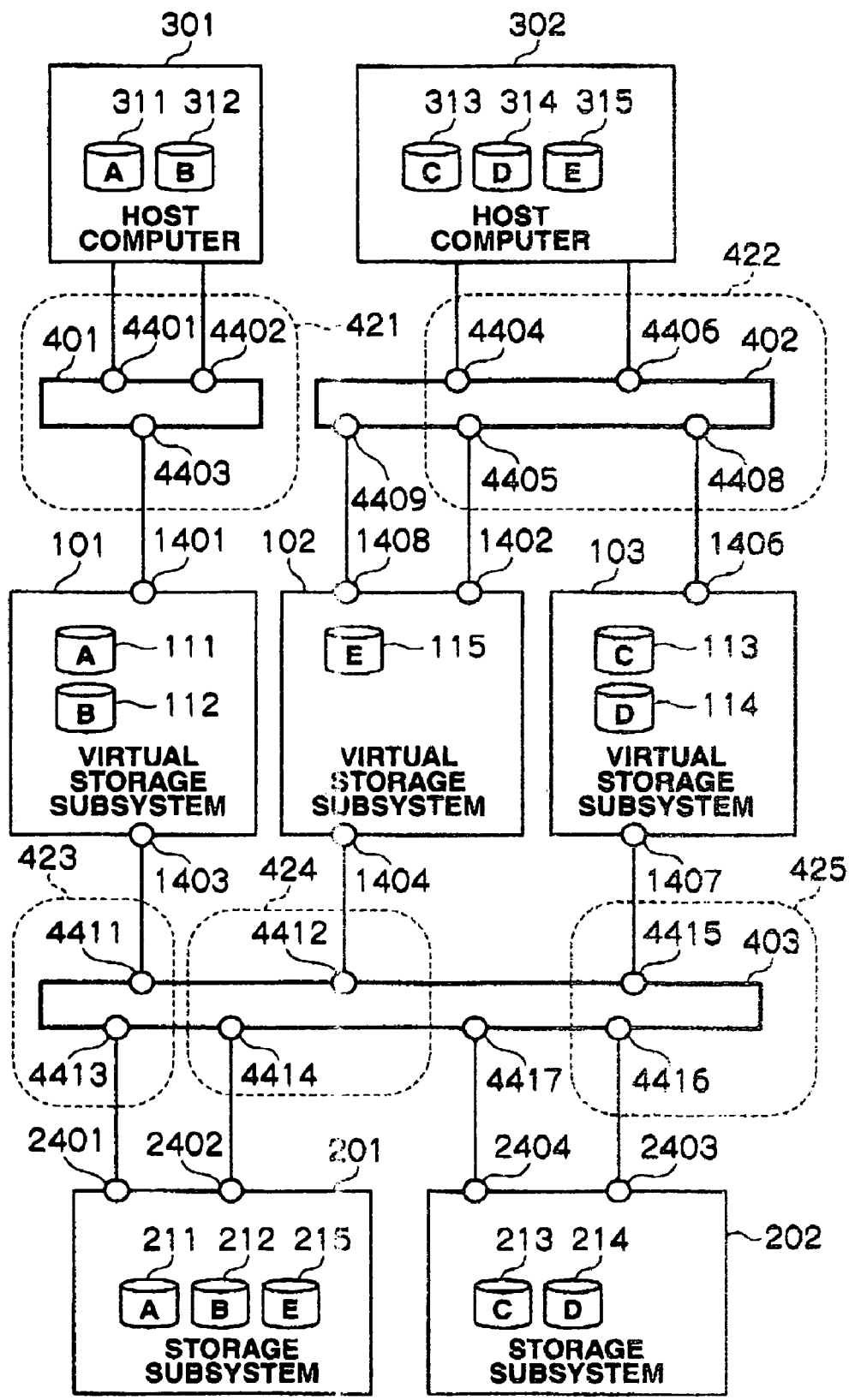
FIG. 3 is a schematic diagram showing a logical configuration of the storage network.

FIG. 3 is a diagram jointly representing the data I/O network illustrated in FIG. 2 with a logical network configuration. The virtual storage subsystem 100, storage subsystem 200, and host computer 300 are the same as those depicted in FIG. 2. The network connection units 401 402, 403 are loaded with data I/O network interfaces 4401 to 4417.

For example, as with the fabric zoning function of a fibre channel switch or the VLAN (Virtual LAN) function of an Ethernet (registered trademark) switch, the network connection unit 400 has a function (zoning function) of partitioning a network into logical areas. If the mounting example of the network connection unit 400 is a fibre channel network switch, the fibre channel switch is able to configure a logical network in network interface units.

In the example shown in FIG. 3, the network connection unit 403 configures three logical networks 423, 424, 425. Among the above, the logical network 423 is configured with the network interfaces 4411, 4413. When the logical network is configured like this, input and output of data beyond the logical network boundary will be prohibited. In the example shown in FIG. 3, communication from the virtual storage subsystem 101 to the storage subsystem 202 will be disabled. In other words, the network connection unit 400 is controlled so as to logically connect a prescribed host computer 300 and a virtual storage subsystem 100 so that the host computer 300 and the virtual storage subsystem 100 become exclusively communicable among the host computers 300 and the virtual storage subsystems 100. Further, the network connection unit 400 is also controlled similarly between the virtual storage subsystems 100 and storage subsystems 200.

In the foregoing configuration, for instance, when the used load of the virtual storage extent 114 of "D" loaded on she virtual storage subsystem 103 increases, the virtual storage subsystem 103 migrates such virtual storage extent to a virtual storage subsystem 100 with a smaller load as follows.

(1) Here, when the virtual storage subsystem 101 is selected as the migration destination, the host computer 302 that was connected to the virtual storage extent 114 of "D" will lose its connection path with the virtual storage extent after migration, and will not be able to communicate. Thus, in this embodiment, the virtual storage subsystem 102 and the host computer 302, and the storage subsystem 202 are placed in a mutually communicable state. Specifically, in this embodiment, as the virtual storage subsystem 100 to be selected as the migration destination, the virtual storage subsystem 102 to which al I/O devices that were connected to the virtual storage extent to be migrated can be physically connected is selected (described in detail later (FIG. 25)).

(2) Similarly, in this embodiment, when the network connection unit 400 further has a function of partitioning the network into logical areas, a logically connectable virtual storage subsystem 102 is selected as the virtual storage subsystem 100 to be selected as the migration destination (described in detail later (FIG. 26)).

Figure 4:
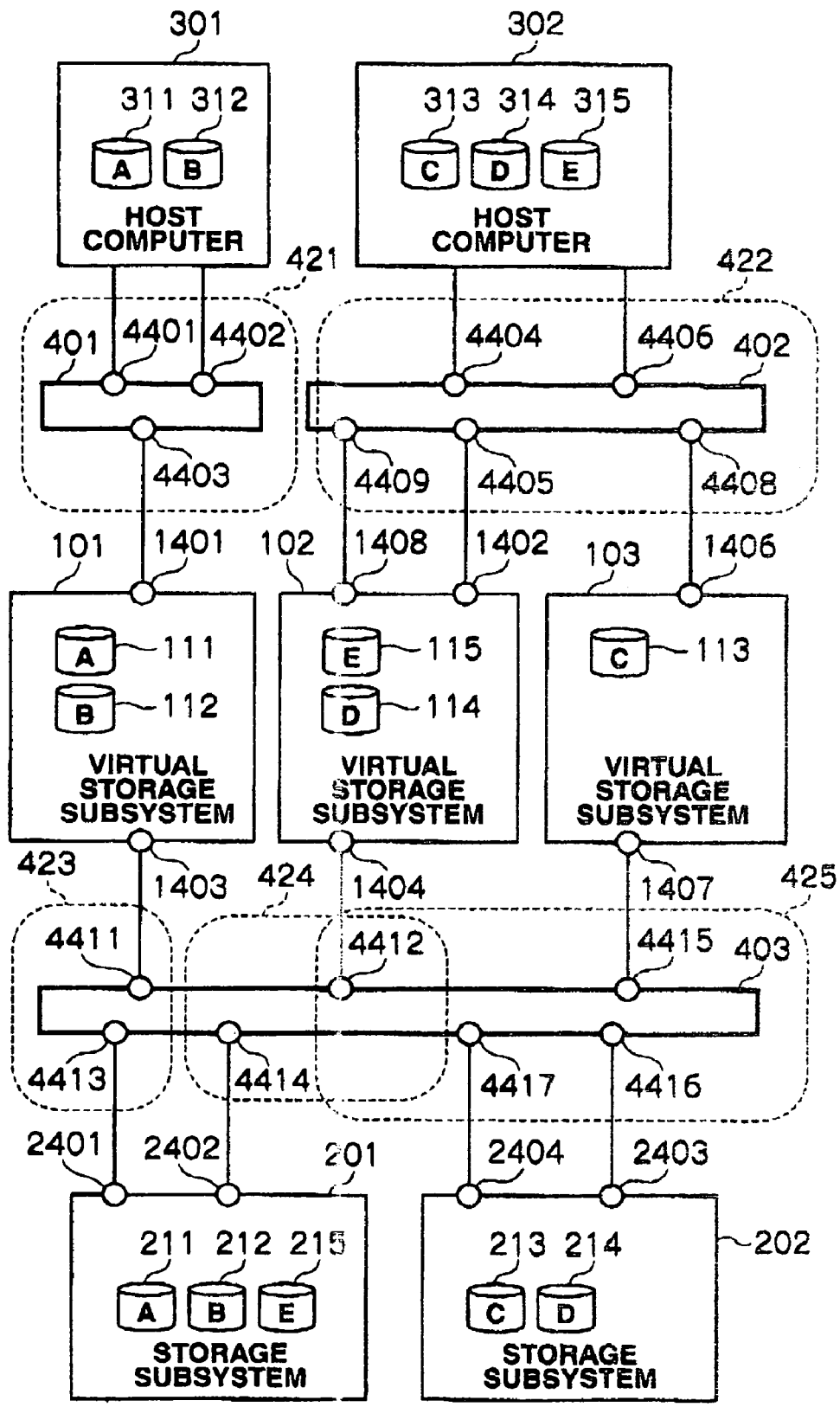
FIG. 4 is a schematic diagram showing a logical configuration of the storage network after the change.

(3) Meanwhile, when the network connection unit 400 does not have a function of partitioning the network into logical areas, even if the virtual storage subsystem 100 selected as the migration destination is physically connectable, there may be cases where it is not able to logically connect to the storage subsystem 200. In the example shown in FIG. 3, although the virtual storage subsystem 102 is able to connect to the storage subsystem 201 due to the restriction of the logical network configuration, it is not able to connect to the storage subsystem 202. Thus, in this embodiment, in order to migrate the virtual storage extent 114 of "D" to the virtual storage subsystem 102, as shown in FIG. 4, configuration of the logical network 425 network of the connection unit 403 is changed so that the virtual storage subsystem 102 and the host computer 302, and the storage subsystem 202 are placed in a mutually communicable state (described in detail later (FIG. 27 to FIG. 31)).

In addition, load is one form of performance. So this embodiment describes the case where the virtual storage subsystem 103 migrates such virtual storage extent to a virtual storage subsystem 100 with a smaller load. However, this invention is not limited to just that migrating, and the virtual storage subsystem 103 migrates such virtual storage extent to a virtual storage subsystem 100 with a better performance.

Figure 5:
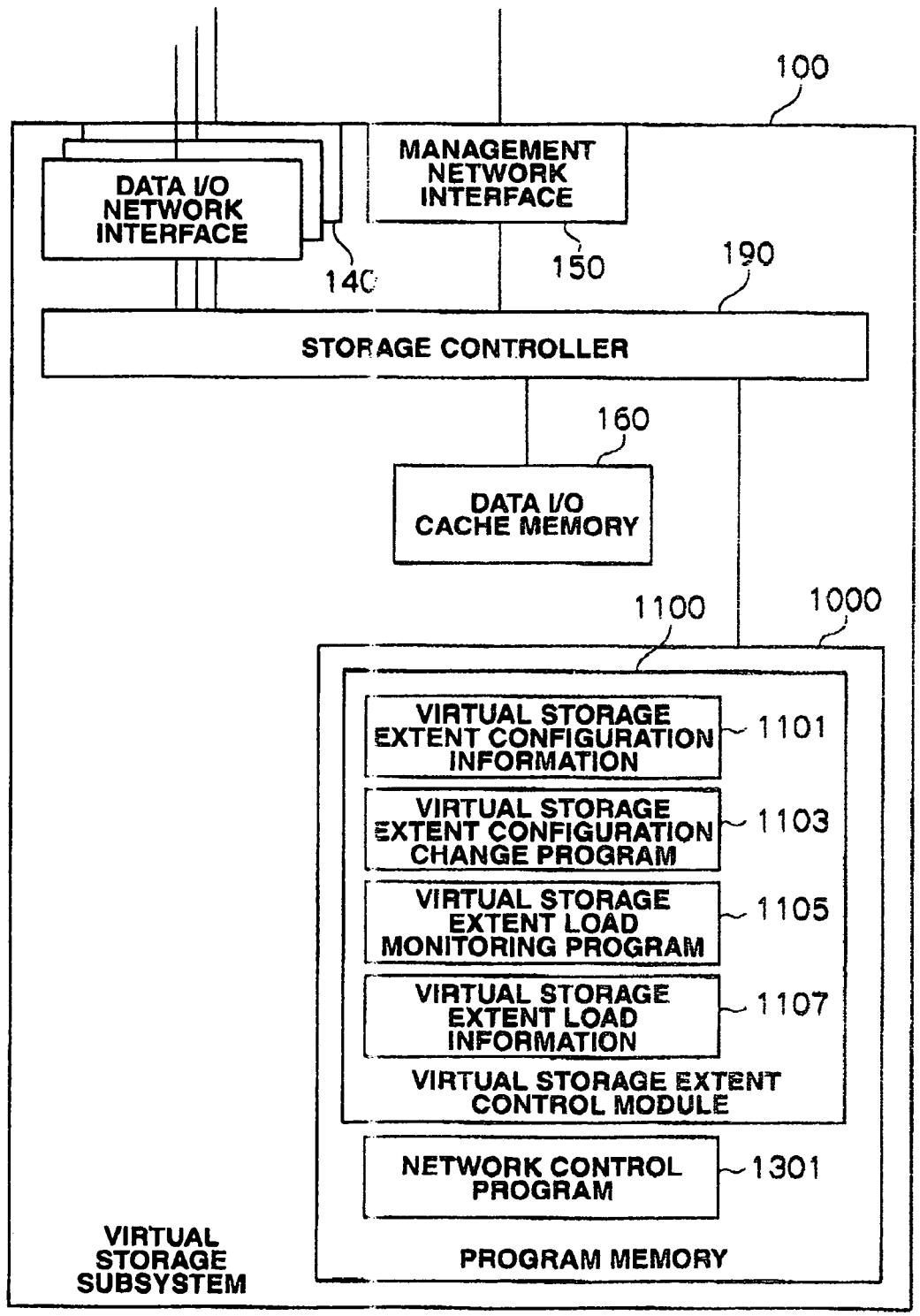
FIG. 5 is a schematic diagram showing a configuration of the virtual storage subsystem.

FIG. 5 shows a configuration example of the virtual storage subsystem 100 (101 to 103). The virtual storage subsystem 100 is configured by a data I/O network interface 140 connected to the network connection unit 400 for inputting and outputting data, a management network interface 150 connected to the management network 600 for inputting and outputting management information a storage controller 190 loaded with a processing for governing the control inside the virtual storage subsystem 100, a program memory 1000 as a memory space for accumulating programs required in operating the virtual storage subsystem 100 and a data I/O cache memory 160 as a temporary storage extent for speeding up the data I/O from the host computer 300 to the storage extent being mutually connected via a storage controller 190.

The data I/O network interface 140 and management network interface 150 may be installed with a network I/O device based on conventional communication technology such as a fibre channel or Ethernet (registered trademark). Incidentally, in the present invention, there is no particular limitation on the number of data I/O network interfaces 140 and the number of management network interfaces 150. Further, the data I/O network interface 140 and the management network interface 150 do not have to be independent, and the data I/O network interface 140 may be commonly used for the purpose of inputting and outputting management information.

The data I/O cache memory 160 is generally installed as a volatile memory but a non-volatile memory or magnetic disk may also be substituted. Incidentally, in the present invention, there is no particular limitation on the number or capacity of the data I/O cache memories 160.

The program memory 1000 is a memory space installed with a magnetic disk or volatile semiconductor memory, and is used for retaining basic programs and information required in operating the virtual storage subsystem 100. The program memory 1000 retains a virtual storage extent control module 1100 configuring the control programs and control information of the virtual storage extent 110. Further, the program memory 1000 is loaded with a network control program 1301 for governing the communication with an external apparatus. The network control program 1301 has the function of operating a network protocol as a means for exchanging information with the communication target, and sending and receiving request messages and data transfer messages on the network.

The virtual storage extent control module 1100 stores virtual storage extent configuration information 1101 as configuration definition data of the virtual storage extent 100, a virtual storage extent configuration change program 1103 for changing the configuration of the virtual storage extent 110, a virtual storage extent load monitoring program 1105 for monitoring the data I/O from the host computer 300 to the virtual storage extent 110 and outputting the observed load information, and virtual storage extent load information 1107 as an accumulation of the output data of the virtual storage extent load monitoring program 1105.

Although the basic configuration of the virtual storage subsystem 100 was described above, the virtual storage subsystem 100 may also be loaded with a storage extent control module 2100, a magnetic disk 220, and a magnetic disk controller 230 described later so as to concurrently play the role and perform the function of the storage subsystem 100. As a result of doubling as the storage subsystem 200, the virtual storage subsystem 100 will have the advantage of being able to provide both the virtual storage extent 110 and the storage extent 210 to the host computer 300.

Figure 6:
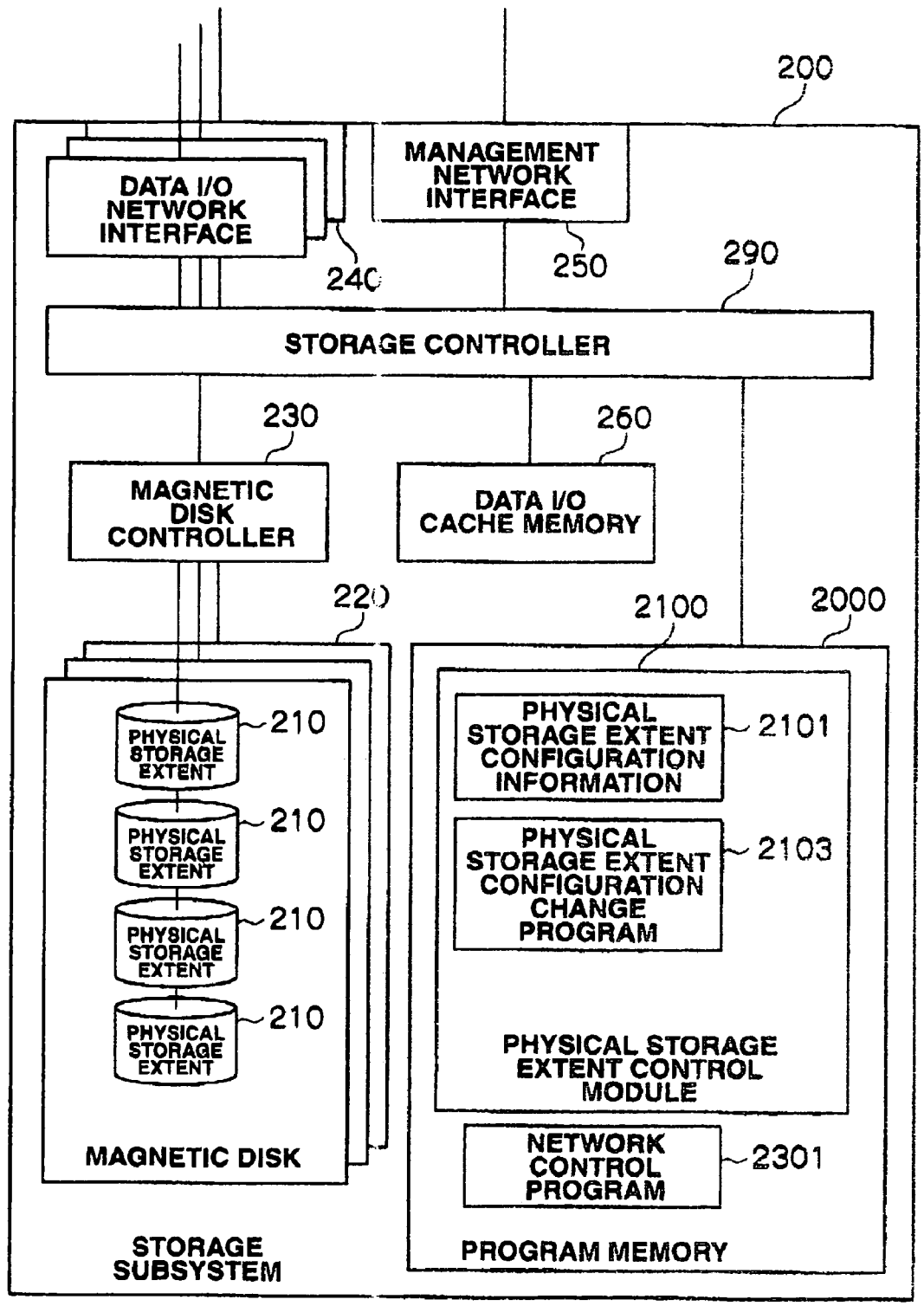
FIG. 6 is a schematic diagram showing a configuration of the storage subsystem.

FIG. 6 shows a configuration example of the storage subsystem 200 (201, 202). The basic configuration of tie storage subsystem 200 is the same as the virtual storage subsystem 100. The data I/O interface 240, the management network interface 250, the storage controller 290 the data I/O cache memory 260, and the program memory 2000 may have the same configuration and be mounted as illustrated in FIG. 5.

The storage subsystem 200 is loaded with a magnetic disk 220. Incidentally, in the present invention, there is no particular limitation on the number or capacity of the magnetic disks 220. The magnetic disk 220 of the storage subsystem 200 is partitioned into the storage extents 210 as the logical unit to be provided to the host computer 300. Incidentally, configuration of the storage extent 210 is defined by the storage extent configuration information 2101 described later. Further, in the present invention, there is no particular limitation on the number of capacity of the storage extents 210. Moreover, the storage subsystem 200 comprises a magnetic disk controller 230 loaded with a processor for governing the control of the magnetic disk 220 in the data I/O processing to the storage extent 210. In addition to a magnetic disk 220, it is also possible to use a flash memory.

The program memory 2000 retains a storage extent control module 2100 configuring the control programs and control information of the storage extent 210. Further, the program memory 2000 is loaded with a network control program 2301 for governing the communication with an external apparatus.

The storage extent control module 2100 stores storage extent configuration information 2101 as configuration definition data of the storage extent 210, and a storage extent configuration change program 2103 for changing the configuration of the storage extent 210.

Figure 7:
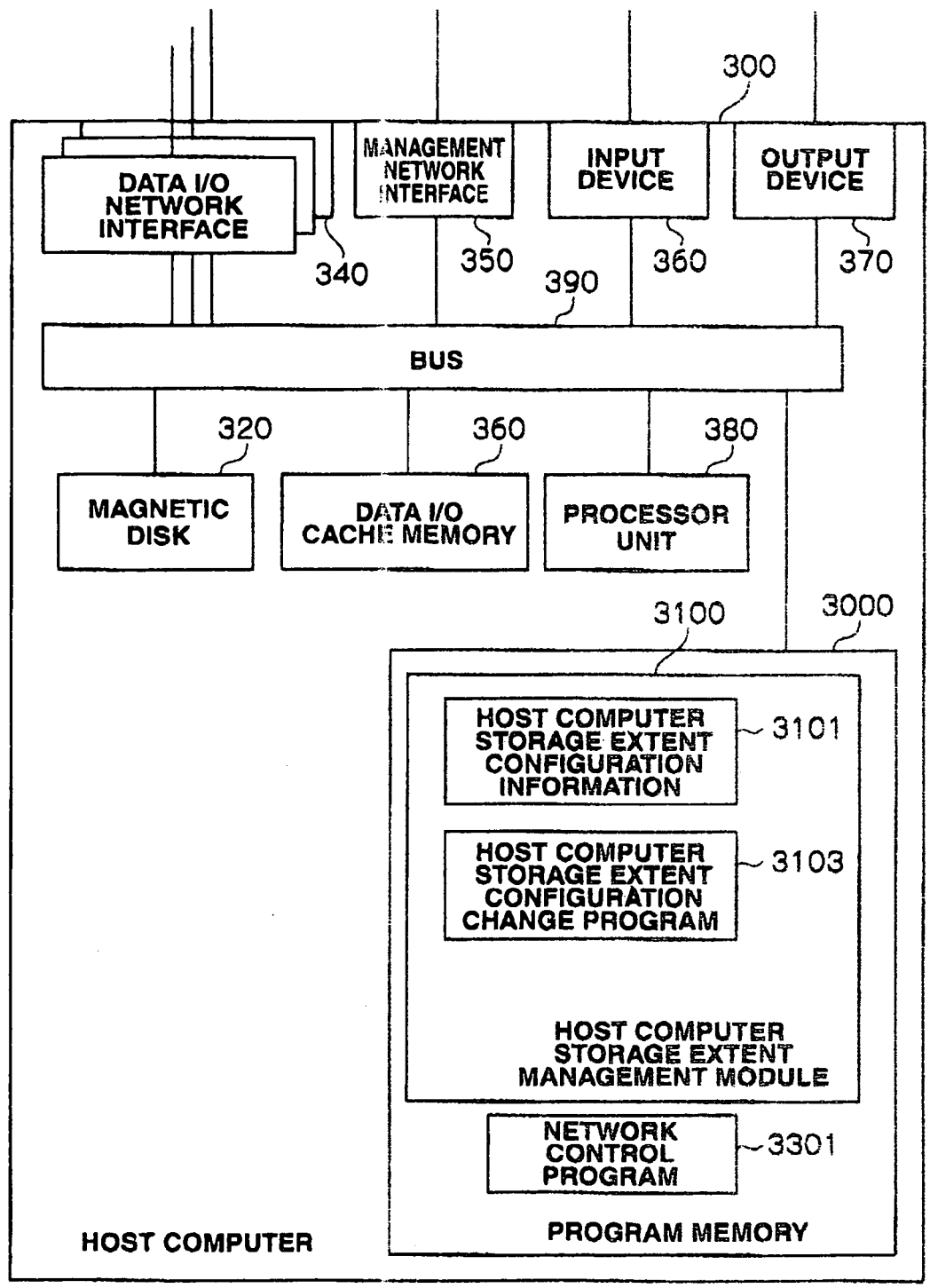
FIG. 7 is a schematic diagram showing a configuration of the host computer.

FIG. 7 shows a configuration example of the host computer 300 (301, 302). The host computer 300 is configured by a data I/O network interface 340 connected to the network connection unit 400 for inputting and outputting data, a management network interface 350 connected to the management network 600 for inputting and outputting management information an input device 360 such as a keyboard or mouse for the operator to input information, an output device 370 such as a general purpose display for the operator to output information, a processor unit 380 corresponding to a CPU for performing various calculations, a magnetic disk 320 for storing basic software such as the operating system and applications, a program memory 3000 as a memory space for accumulating programs required in operating the host computer 300, and a date I/O cache memory 360 installed as a volatile memory or the like for speeding up the input and output of data being mutually connected via a communication bus 390. In other words, the hardware configuration of the host computer 300 illustrated in this example can be realized with a general purpose computer (Personal Computer: PC).

The data I/O network interface 340 and management network interface 350 may be installed with a network I/O device according to conventional communication technology such as a fibre channel or Ethernet (registered trademark). Incidentally, in the present invention, there is no particular limitation on the number of data I/O network interfaces 340 and the number of management network interfaces 350. Further, the data I/O network interface 340 and the management network interface 350 do not have to be independent, and the data I/O network interface 340 may be commonly used for the purpose of inputting and outputting management information.

The data I/O cache memory 380 is generally installed as a volatile memory, but a non-volatile memory or magnetic disk may also be substituted. Incidentally in the present invention, there is no particular limitation on the number or capacity of the data I/O cache memories 360.

The program memory 3000 is a memory space installed with a magnetic disk or volatile semiconductor memory, and is used for retaining basic programs and information required in operating the host computer 300. The program memory 3000 retains a host computer storage extent management module 3100 configuring the control programs and control information of the logical storage extent; that is, the logical volume as the logical unit for the host computer to input and output data. Further, the program memory 3000 is loaded with a network control program 3301 for governing the communication with an external apparatus.

The host computer storage extent management module 3100 stores host computer storage extent configuration information 3101 as configuration information of the logical storage extent; that is the logical volume mounted on the file system operated by the host computer 300, and a host computer storage extent configuration change program 3103 for changing the configuration of the host computer storage extent 310.

Figure 8:
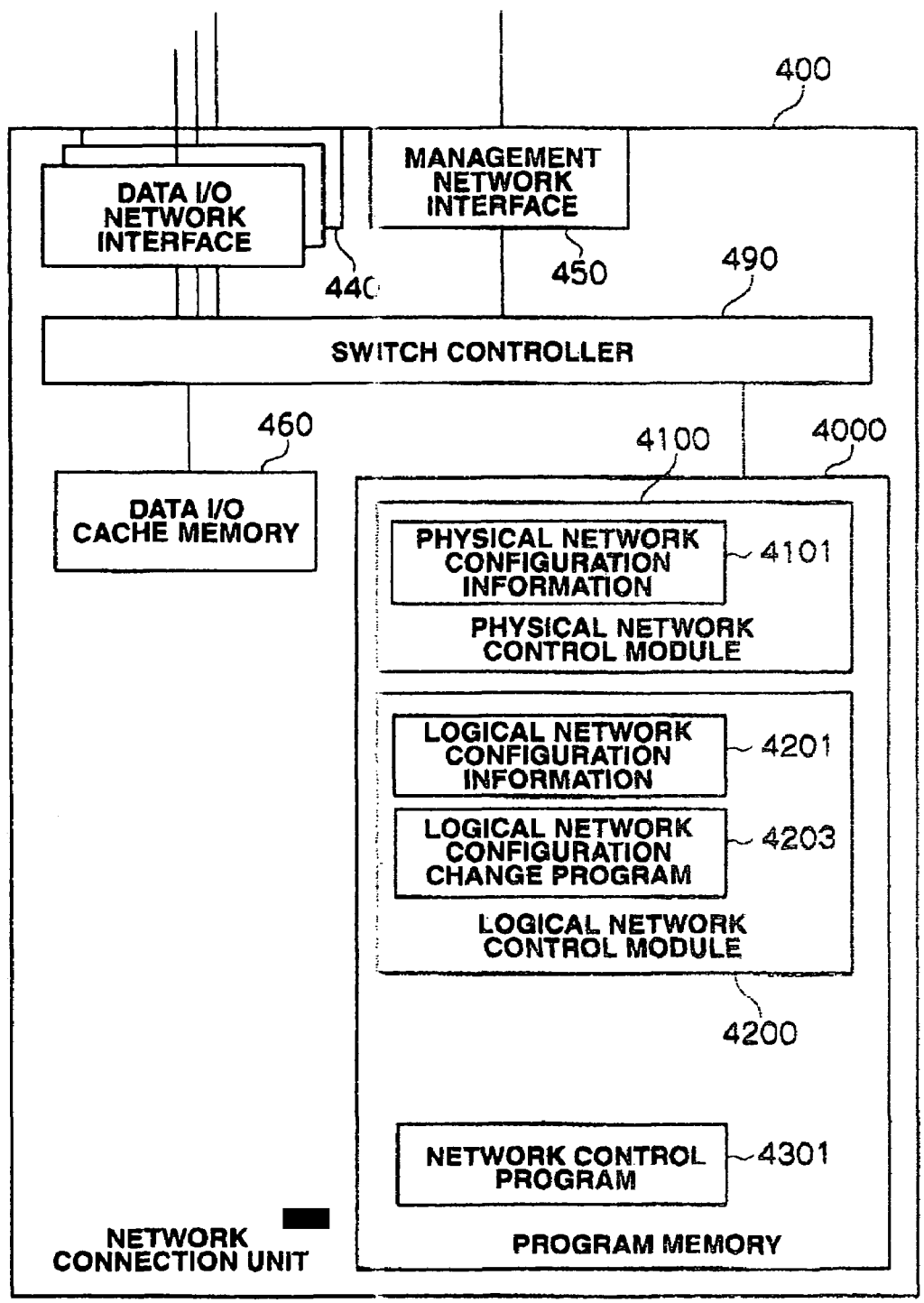
FIG. 8 is a schematic diagram showing a configuration of the network connection unit.

FIG. 8 shows a configuration example of the network connection unit 400 (401 to 403). The network connection unit 400 is configured by a data I/O network interface 440 connected to an external apparatus for inputting and outputting data, a management network interface 450 connected to the management network 600 for inputting and outputting management information, a program memory 4000 as a memory space for accumulating programs required in operating the network connection unit 400, a data I/O cache memory 460 for temporarily accumulating data to be transferred, and a switch controller 490 loaded with a processor governing the control inside the network connect on unit 400 being mutually connected via the switch controller 490.

The program memory 4000 is a memory space installed with a magnetic disk or volatile semiconductor memory, and is used for retaining basic programs and information required in operating the network connection unit 400. The program memory 4000 retains a physical network control module 4100 that configures control information for managing the physical connection relationship among the apparatuses configuring the network, and a logical network control module 4200 configuring the logical partitioning configuration information and control programs of the network. The program memory 4000 is also loaded with a network control program 4301 for governing the communication with an external apparatus.

The physical network control module 4100 stores physical network configuration information 4101 for retaining the physical connection relationship of the data I/O network interface 440 of the network connection unit 400 and an external apparatus.

The logical network control module 4200 stores logical network configuration information 4201 as definition information of the logical partitioning configuration of the network, and a logical network configuration change program 4203 for changing the logical network configuration.

Figure 9:
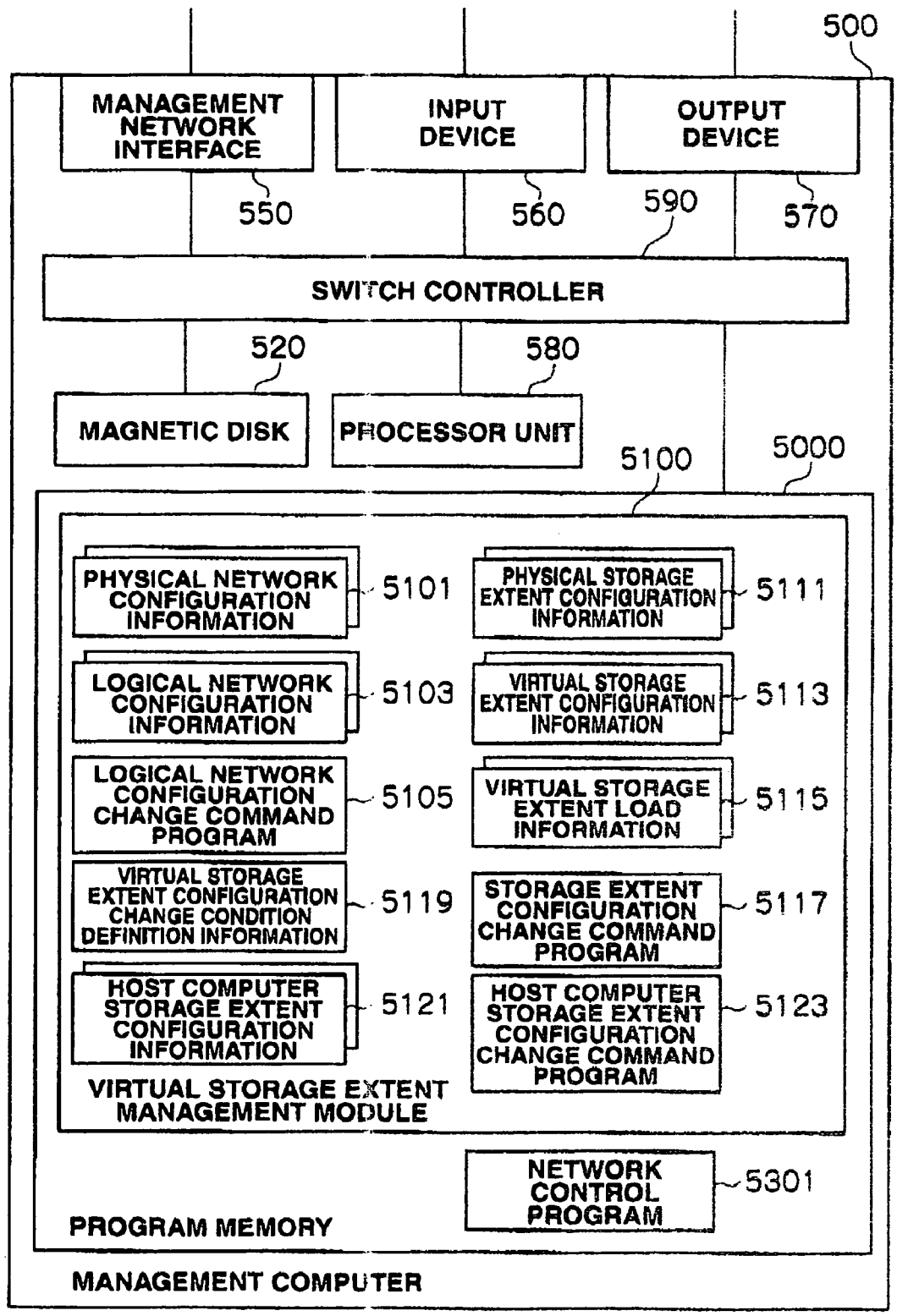
FIG. 9 is a schematic diagram showing a configuration of the management computer.

FIG. 9 shows a configuration example of the management computer 500. The management computer 500 is configured by a management network interface 550 connected to a management network 600 for inputting and outputting management information, an input device 560 such as a keyboard or mouse for the operator to input information, an output device 570 such as a general purpose display for the operator to output information, a processor unit 580 corresponding to a CPU for performing various calculations, a magnetic disk 520 for storing basic software such as an operating system and applications, and a program memory 5000 as a memory space for accumulating programs required in operating the management computer 500 being mutually connected via a communication bus 590. In other words, the hardware configuration or the management computer 500 can be realized with a general purpose computer (PC).

The program memory 5000 is a memory space installed with a magnetic disk or volatile semiconductor memory, and is used for retaining basic programs and information required in operating the management computer 500. In order for the management computer 500 to optimally maintain the configuration of the virtual storage extent 110, the program memory 5000 retains a virtual storage extent management module 5100 for configuring the control programs and control information for managing the configuration of the virtual storage subsystem 100, the storage subsystem 200, the host computer 300, and the network connection unit 400. The program memory 5000 is also loaded with a network control program 5301 for governing the communication with an external apparatus.

In addition to the configuration information including the virtual storage extent configuration information 5113 and the virtual storage extent load information 5115 collected from the virtual storage subsystem 100, the storage extent configuration information 5111 collected from the storage subsystem 200, the host computer storage extent configuration information 5121 collected from the host computer 300, and the physical network configuration information 5101 and the logical network configuration information 5103 collected from the network connection unit 400, the virtual storage extent management module 5100 also stores the respective control programs including the storage extent configuration management program 5117, the host computer storage extent configuration change command program 5123, and the logical network configuration change command program 5105 for commanding a change of configuration to the external apparatuses and virtual storage extent configuration change condition definition information 5119 set by the administrator via the input device defining the conditions to be used in determining whether to change the configuration of the virtual storage extent.

Figure 10:
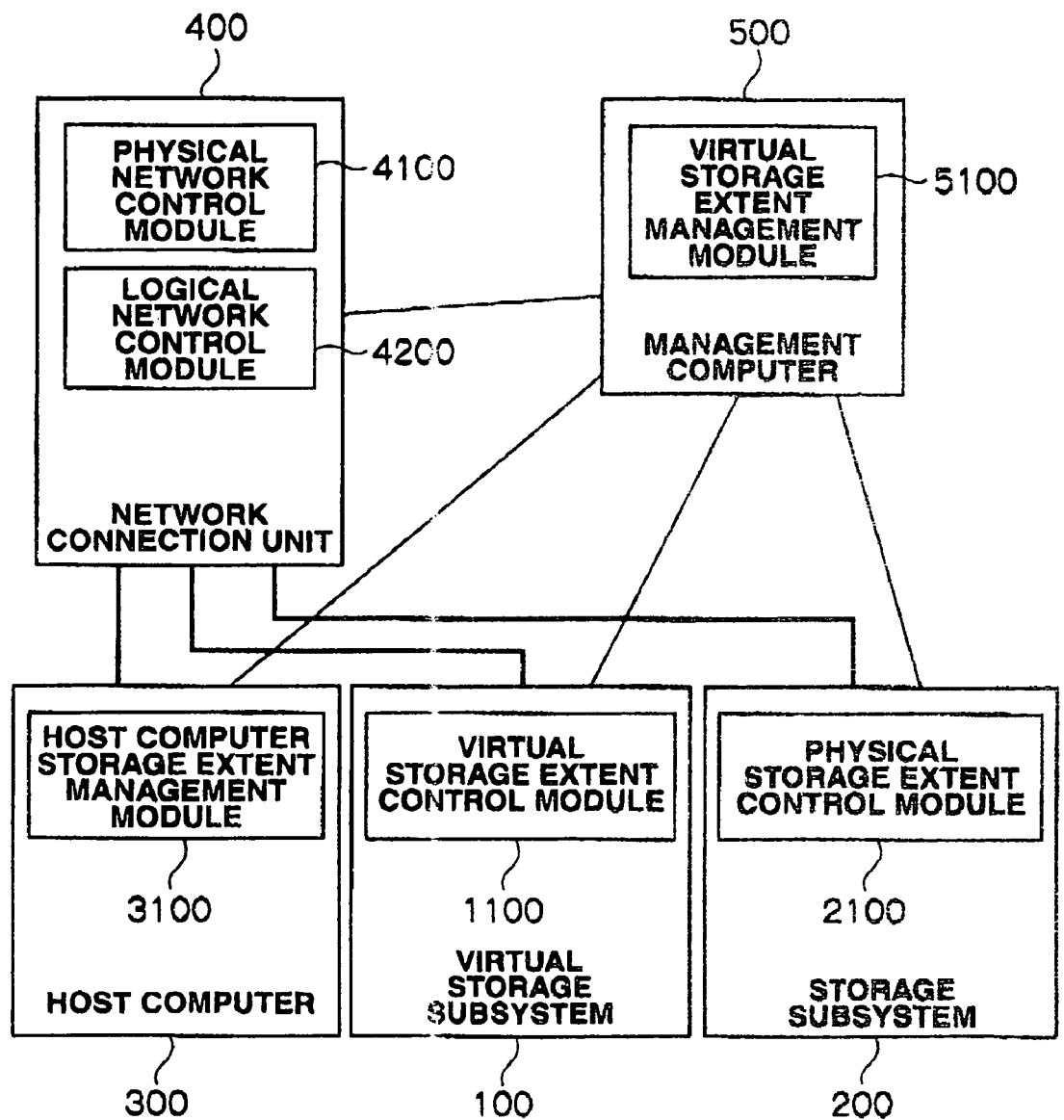
FIG. 10 is a conceptual diagram showing a functional layout example of a configuration of the storage network.

FIG. 10 represents the roles of the respective apparatuses illustrated in the configuration examples of FIG. 5 to FIG. 9 with a more concise logical diagram. FIG. 10 coincides with the configuration of FIG. 5 to FIG. 9, and depicts a configuration where the network connection unit 400 mounted with the physical network control module 4100 and the logical network control module 4200, the host computer 300 mounted with the host computer storage extent management module 3100, the virtual storage subsystem 100 mounted with the virtual storage extent control module 1100 and the storage extent 2100, and the storage subsystem 200 mounted with the storage extent control module 2100 are mutually connected via the network connection unit 400, and the foregoing apparatuses are managed by the management computer 500 mounted with the virtual storage extent management module 5100.

Figure 11:
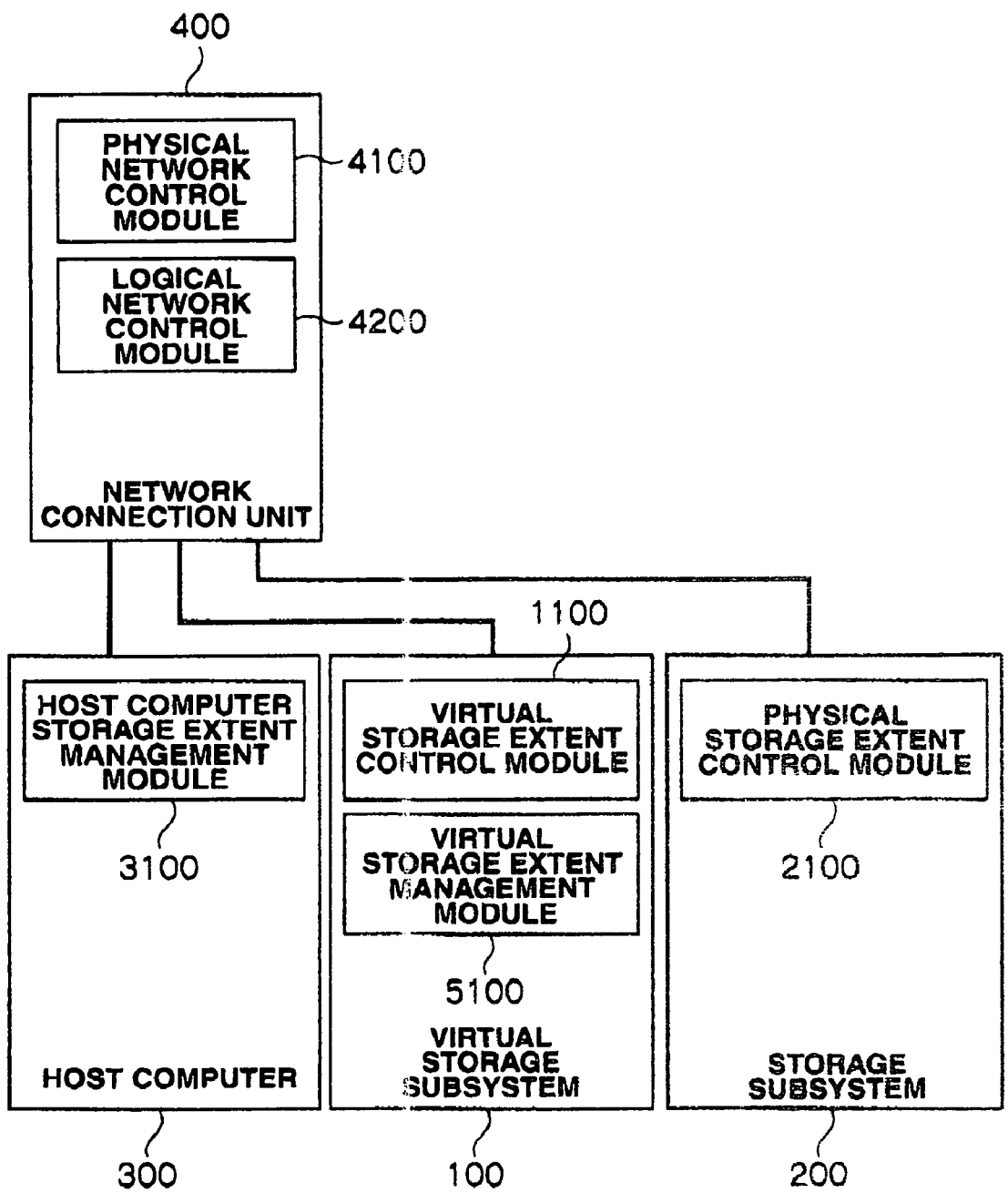
FIG. 11 is a conceptual diagram showing a functional layout example of a configuration of the storage network.

FIG. 11 illustrates an embodiment according to a different configuration. The embodiment of FIG. 11 does not use the management computer 500 as an independent apparatus, and illustrates an example where the virtual storage extent management module 5100 is mounted on the virtual storage subsystem 100. The present invention can also be realized with an embodiment having this kind of configuration.

FIG. 12 shows a configuration example of the storage extent configuration information 5111 loaded in the management computer 500. The storage extent configuration information 5111 is configured with an apparatus identification number 51111 as information for uniquely identifying the storage subsystem 200 loaded with the storage extent 210, a data I/O network interface number 51112 as information for uniquely identifying the data I/O network interface 240 used in the input and output of data of the storage extent 210, a storage extent identification number 51113 as information for uniquely identifying the storage extent 210, and a magnetic disk identification number 51114 as information for uniquely identifying one or more magnetic disks 220 configuring the storage extent 210.

In FIG. 12, for example the storage extent "00:0D (214)" loaded in the storage subsystem 200 (represented as storage subsystem 202 in FIG. 2 to FIG. 4; hereinafter the same) identified with "SN202" is connected to the data I/O network interface 240 (2403) identified with "50:06:0A:0B:0C:0D:24:03", and four magnetic disks 220 of "HDD501 to 504" are configuring the storage extent "00:0D (214)".

FIG. 13 shows a configuration example of the virtual storage extent configuration information 5113 loaded in the management computer 500. The virtual storage extent configuration information 5113 represents the relation of the virtual storage extent identifying information 51131 as configuration definition information of the virtual storage extent 110, and the storage extent Identifying information 51132 as configuration definition information of the storage extent 210 actually associated with the virtual storage extent 110.

In FIG. 13, for example, the virtual storage extent "0D:00 (114)" defined in the virtual storage subsystem 100 (103) identified with "SN103" is connected to the data I/O network interface 140 (1406) identified with "50:06:0A:0B:0C:0D: 14:06", and the storage extent 210 configuring the virtual storage extent "0D:00 (114)" is the storage extent "00:0D (214)" connected to the data I/O network interface 240 (2403) identified with "50:06:0A:0B:0C:0D:24:03".

FIG. 14 represents a diagram representing the respective configurations and relations defined with the storage extent configuration information 5111 of FIG. 12 and the virtual storage extent configuration information 5113 of FIG. 13 with a more specific logical diagram.

FIG. 15 shows a configuration example of the physical network configuration information 5101 loaded in the management computer 500. The physical network configuration information 5101 is configured with an apparatus identification number 51011 as information for uniquely identifying the network connection unit 400, a data I/O network interface number 51012 as information for uniquely identifying the data I/O network interface 440 mounted on the network connection unit 400, a connection destination apparatus identification number 51013 as information for uniquely identifying the apparatus as the connection destination of the data I/O network interface 440, and a connection destination data I/O network interface number 51014 as information for uniquely identifying the data I/O network interface on the connection destination apparatus. Incidentally the physical network configuration information 5101 is collective information of the physical network configuration information 4101 acquired from the respective network connection units 400.

In FIG. 15, as shown in FIG. 3, for instance, "50:06:0A: 0B:0C:0D:44:08(4408)" as the data I/O network interface 440 mounted on the network connection unit 400 (402) identified with "SN402" is connected to "50:06:0A:0B:0C:0D: 14:06(1406)" as the data I/O network interface 140 mounted on the virtual storage subsystem 100 (103) identified with "SN103".

FIG. 18 shows a configuration example of the logical network configuration information 5103 loaded in the management computer 500. The logical network configuration information 5103 is configured with a logical network identification number 51031 as information for uniquely identifying the logical network, and an apparatus identification number 51032 and a data I/O network interface number 51033 as information for uniquely identifying the data I/O network interface 440 registered in the logical network. Incidentally, the logical network configuration information 5103 is collective information of the logical network configuration Information 4201 acquired from the respective network connection units 400. Further, in this embodiment, although a case of hardware zoning that configures a logical network in data I/O network interface 440 units was explained, software zoning where the target corresponding to the respective data I/O network interface numbers 51033 in FIG. 16 is a WWN (World Wide Name) of the host computer 300 and storage subsystem 200 instead of the data I/O network interface number 51033 may also be used.

In FIG. 16, as illustrated in FIG. 3, for example, "50:06: 0A:0B:0C:0D:44:15(4415)" and "50:06:0A:0B:0C:0D):44: 16(4416)" as the data I/O network interface 440 mounted on the network connection unit 400 (403) identified with "SN403" are registered in the logical network Identified with "ZONE425".

FIG. 17 shows a configuration example of the virtual storage extent load information 5515 loaded in the management computer 500. The virtual storage extent load information 5115 is configured with an apparatus identification number 51151 as information for uniquely identifying the apparatuses loaded with the virtual storage extent 110, a data I/O network interface 51152 as information for uniquely identifying the data I/O network interface 140 mounted on such apparatuses, and a data I/O network interface busy rate 51153 as load information measured within a certain period in the data I/O network interface 140.

The data I/O network interface busy rate 51153, for example, is load information measured for 24 hours on the previous day, and the ratio of the communication data volume in relation to the maximum band of the data I/O network interface 140 can be represented as a busy rate. For instance, if the communication data volume actually transferred by a data I/O network interface 140 capable of transferring 1000 MB per second is averaged at 80 MB per second, the busy rate can be calculated as "8%".

In FIG. 17, the busy rate of the data I/O network interface 140 (1406) identified with "50:06:0A:0B:0C:0D:14:06" and mounted on the virtual storage subsystem 100 (103) identified with "SN103" is "90%".

FIG. 18 shows a configuration example of the virtual storage extent configuration change condition definition information 5119 loaded in the management computer 500. The virtual storage extent configuration change condition definition information 5119 is configured with apparatus identifying information 51191 and a virtual storage extent identification number 51192 as information for uniquely identifying the virtual storage extent 110, and a data I/O network interface busy rate threshold value 51193 as a threshold value defined in the virtual storage extent 110.

The data I/O network interface busy rate threshold value 51193 is a threshold value of the busy rate of the data I/O network interface 140 associated with the virtual storage extent 110 and, when the busy rate exceeds the threshold value defines the conditions for changing the connection destination of the data I/O network interface 140 so that the busy rate does not exceed the threshold value. Incidentally, the data I/O network interface busy rate threshold value 51193 is individually defined by the administrator or the like for each virtual storage extent 110 associated with the connection destination data I/O network interface 140.

In FIG. 18, when the load or the data I/O network interface 140 mounted on the virtual storage subsystem 100 (103) identified with "SN103" and associated with the virtual storage extent 110 (114) identified with "0D:00 (114)" exceeds "50%", conditions for changing the connection destination data I/O network interface 140 of the virtual storage extent 110 (114) to an interface with a smaller load is defined.

FIG. 19 shows a configuration example of the host computer storage extent configuration information 5121 loaded in the management computer 500. The host computer storage extent configuration information 5121 is configured with an apparatus identification number 51211 as identifying information of the host compute 300 mounted with the host computer storage extent 310, host computer storage extent identifying information 51212 as identifying information of the host computer storage extent 310, a data I/O network interface number 51213 representing the data I/O network interface of the storage extent configuring the host computer storage extent 310, and storage extent identifying information 51214 as information for uniquely Identifying the storage extent.

Figure 20:
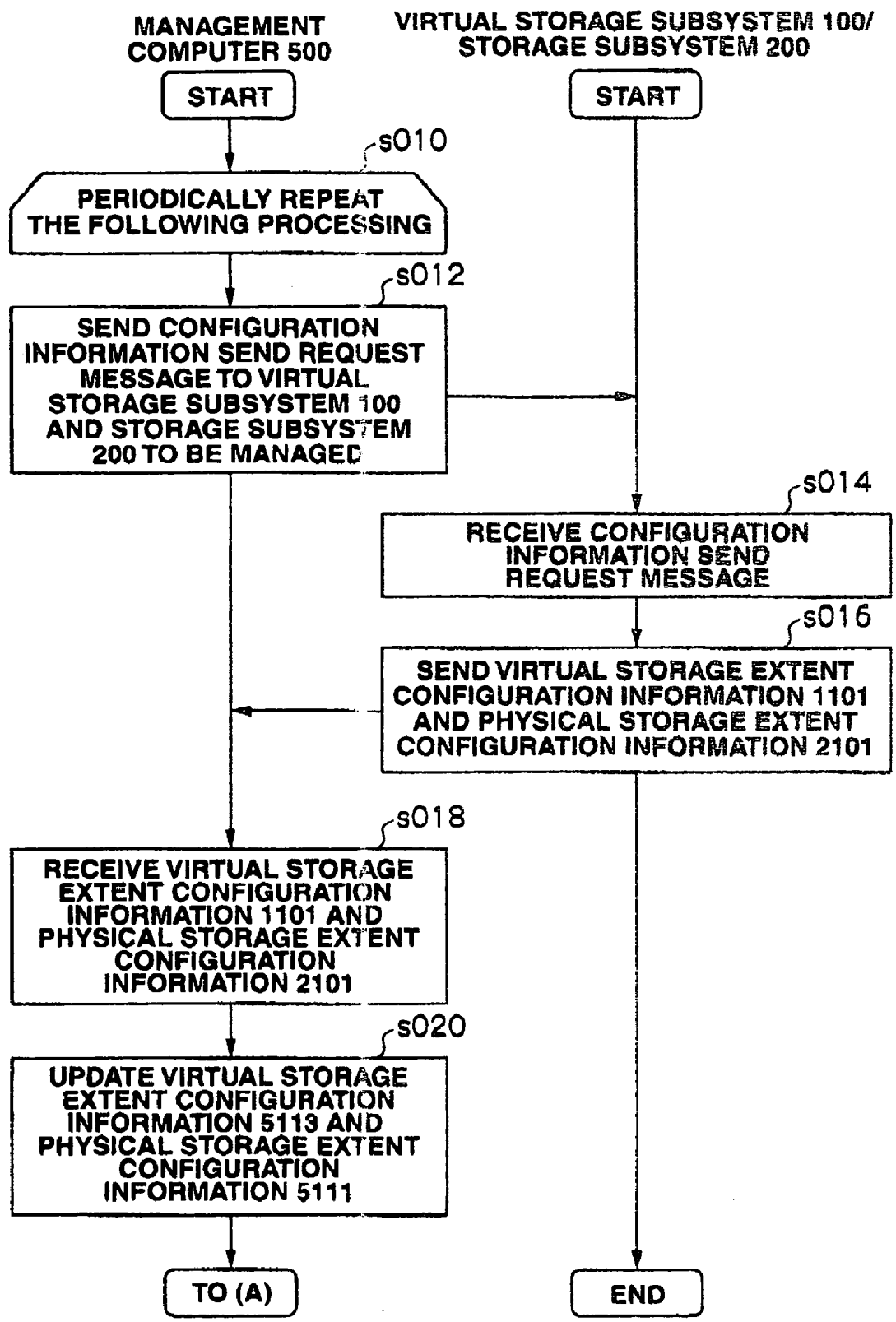
FIG. 20 is a flowchart explaining the storage extent configuration information update processing.

FIG. 20 is a flowchart of routine for the management computer 500 to communicate with the virtual storage subsystem 100 and update the virtual storage extent configuration information 5113, and communicate with the storage subsystem 200 and update the storage extent configuration information 5111.

In order to maintain the virtual storage extent configuration information 5113 and storage extent configuration information 5111 up to date, the management computer 500 periodically repeats the subsequent processing in a time interval, for instance, of 5 minutes, 1 hour, or 1 day (step s010). Incidentally, the repetition of step s010 is also continued in FIG. 21 and FIG. 22.

The management computer 500 issues a configuration information send request message to the virtual storage subsystem 100 and storage subsystem 200 to be managed by the management computer 500 (step s012). The sending and receiving of messages is conducted by the processor unit 580 using the network control program 5301. Incidentally the communication processing of the present invention is similarly conducted by the processor unit or storage controller, or switch controller via the network control programs 1301, 2301, 3301, 4301, 5301.

The virtual storage subsystem 100 and the storage subsystem 200 respectively receive the configuration information send request message (step s014).

The virtual storage subsystem 100 that received the configuration information send request message sends the virtual storage extent configuration information 1101 to the management computer 500 (step s016). Similarly, the storage subsystem 200 sends the storage extent configuration information 2101 to the management computer 500 (step s016).

The management computer 500 receives the virtual storage extent configuration information 1101 and the storage extent configuration information 2101 (step s018).

The management computer 500 updates its virtual storage extent configuration information 5113 and storage extent configuration information 5111 based on the received information (step s020).

Figure 21:
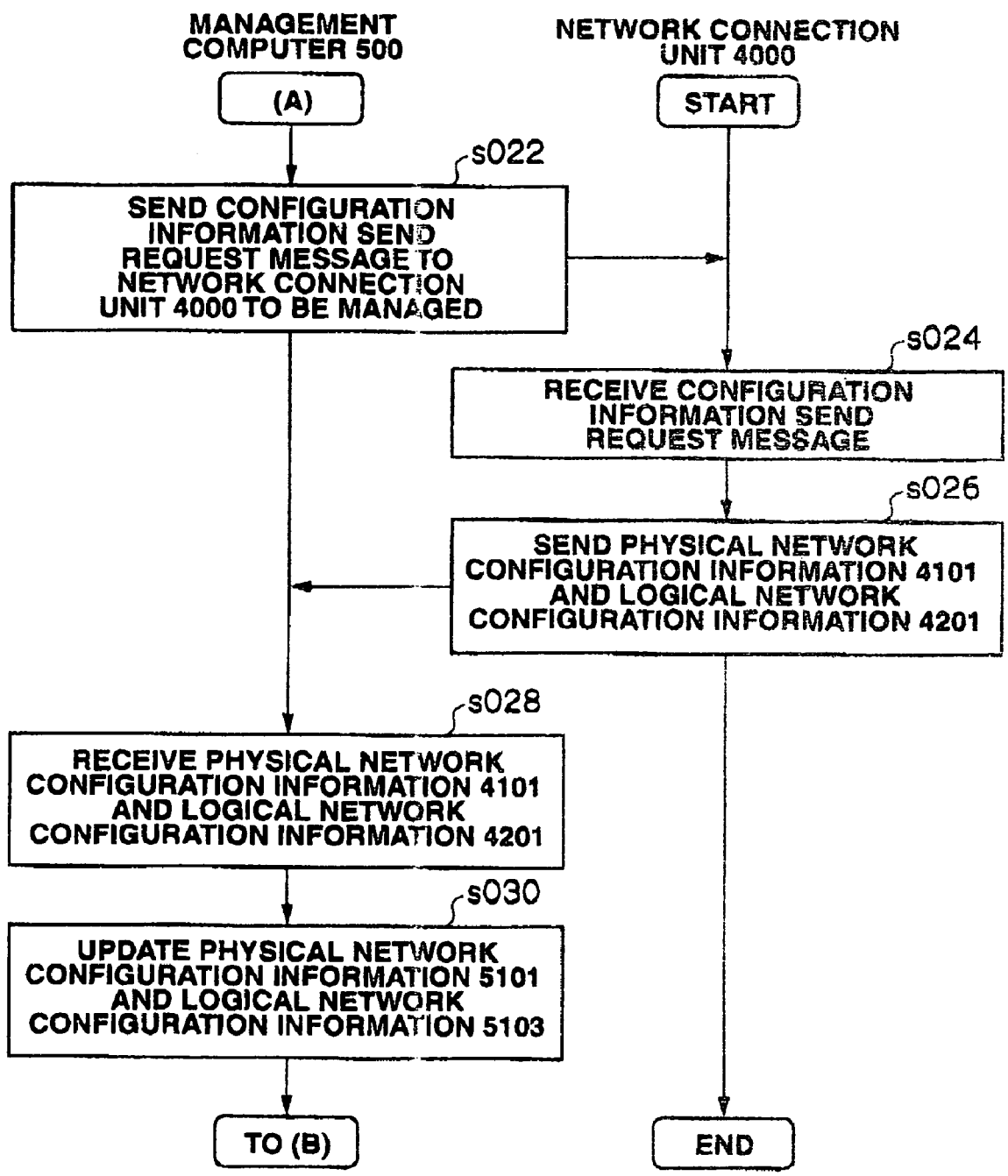
FIG. 21 is a flowchart explaining the network configuration information update processing.

FIG. 21 is a flowchart of a routine for the management computer 500 to communicate with the network connection unit 400 and update the physical network configuration information 5101 and the logical network configuration information 5103. Steps s022 to s030 of FIG. 21 are the same as the respective processing operations of steps s012 to s020 of FIG. 20.

Figure 22:
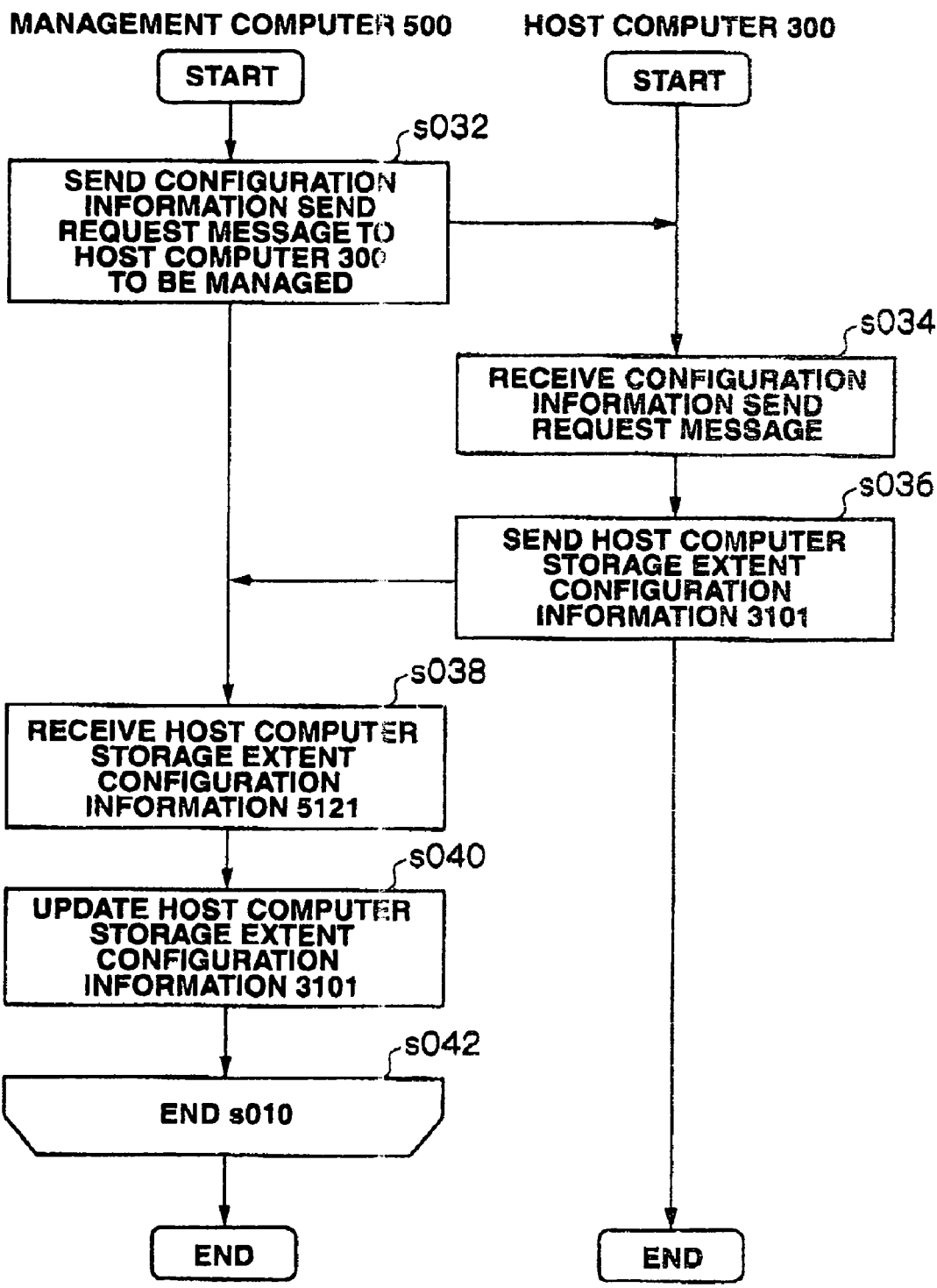
FIG. 22 is a flowchart explaining the host computer storage extent update processing.

FIG. 22 is a flowchart of a routine for the management computer 500 to communicate with the host computer 500 and update the host computer storage extent configuration information 5121. Steps s032 to s040 of FIG. 22 are the same as the respective processing operations of steps s012 to s020 of FIG. 20.

Figure 23:
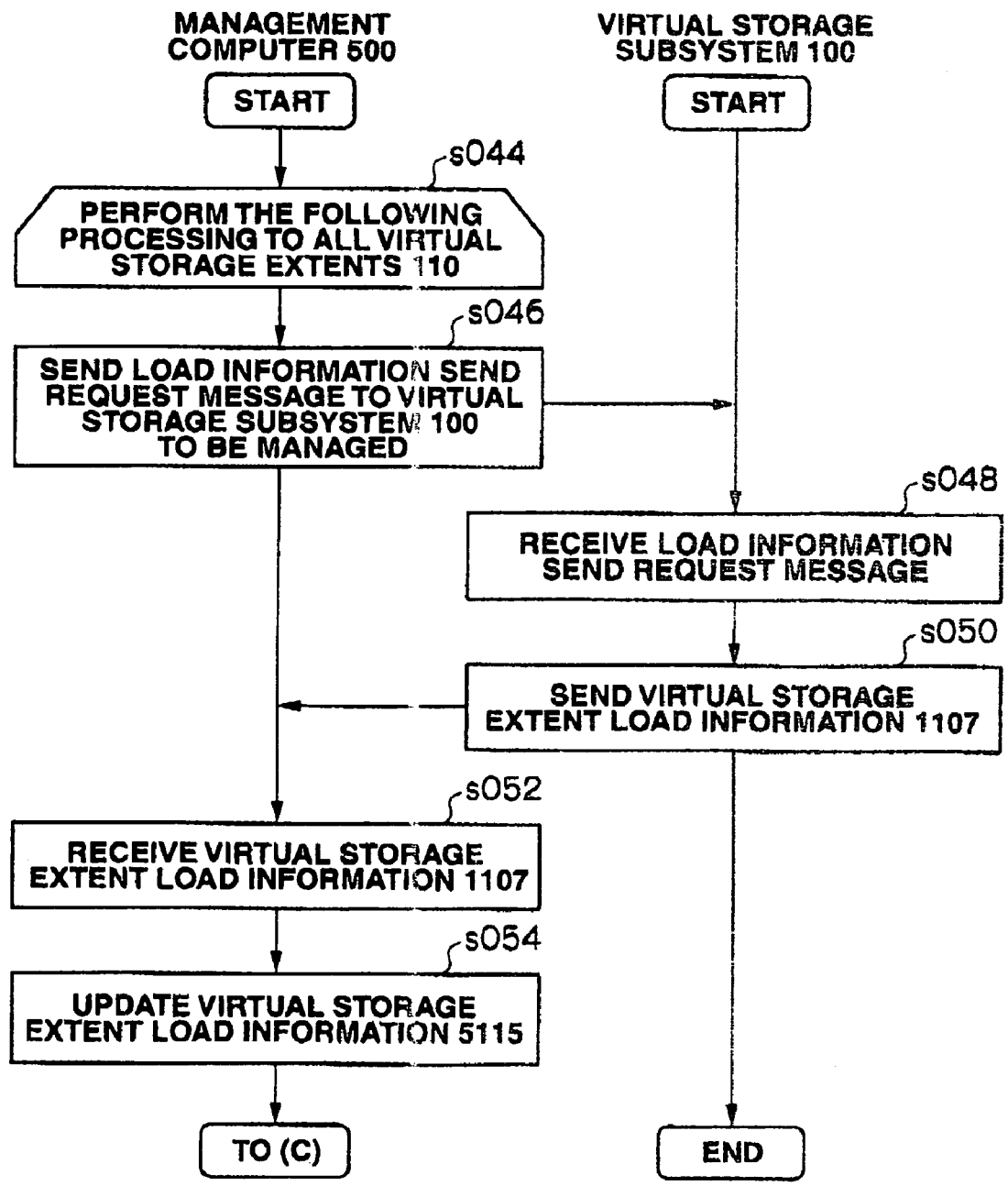
FIG. 23 is a flowchart explaining the virtual storage extent load information update processing.

FIG. 23 is a flowchart of a routine for the management computer 500 to communicate with the virtual storage subsystem 100 and update the virtual storage extent load information 5115. The management computer 500 performs the following repetition processing to all virtual storage extents 110 recorded in the virtual storage extent configuration information 5113 (step s044).

Steps s046 to s054 of FIG. 23 are the same as the respective processing operations at steps s012 to s020 of FIG. 20.

Figure 24:
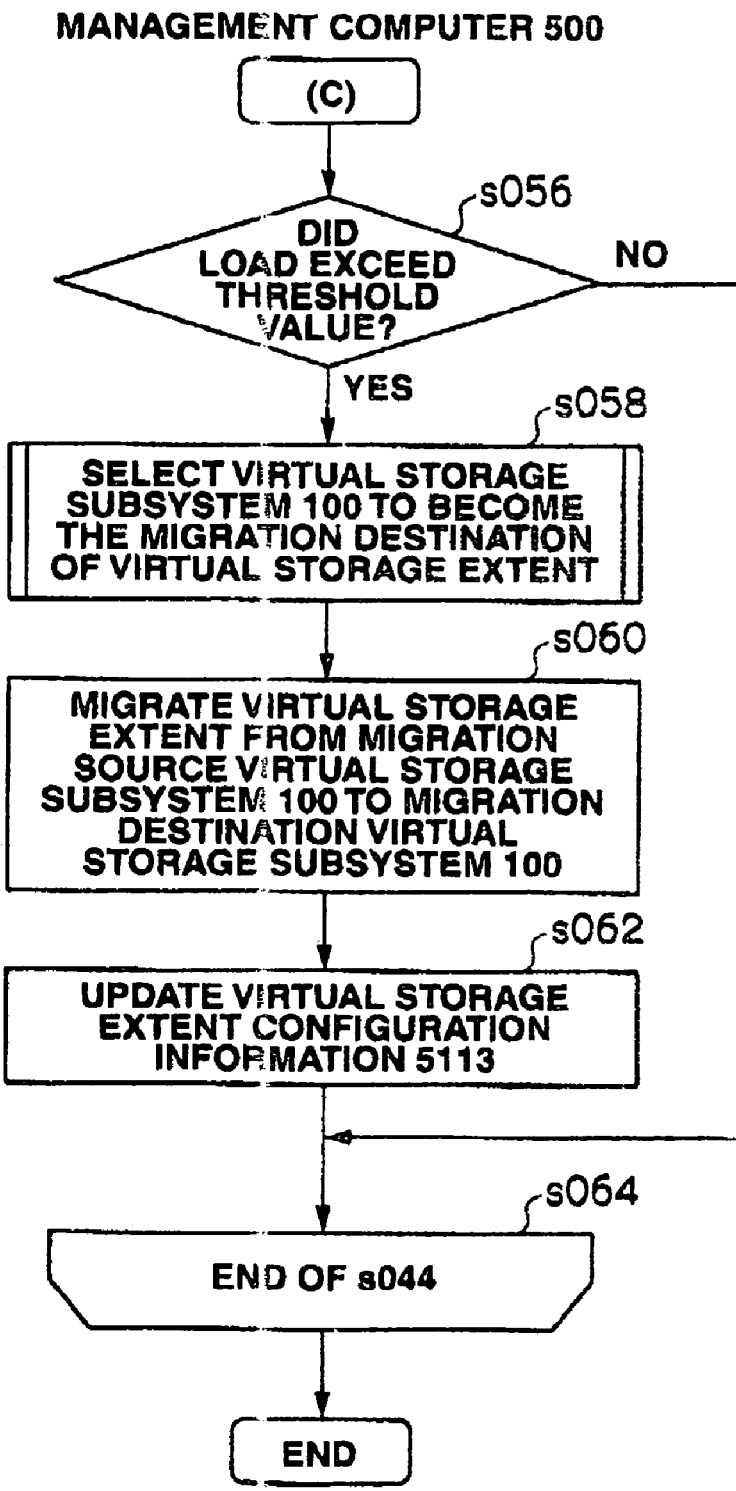
FIG. 24 is a flowchart explaining the virtual storage extent migration processing.

FIG. 24 is a flowchart showing a general routine of the processing for the management computer 500 to migrate the virtual storage extent 110 to a different virtual storage subsystem 100 based on the received virtual storage extent load information 5115.

The processor unit 580 of the management computer 500 executes the following steps s058 to s062 with the storage extent configuration change command program 5117.

At step s056, the management computer 500 determines whether the load of the virtual storage extent 110 recorded in the virtual storage extent load information 5115 is greater than the threshold value recorded in the virtual storage extent configuration change condition definition information 5119 (step s056). As a result of the determination at s056, the management computer 500 proceeds to the subsequent processing when the observed load is exceeding the threshold value (YES at step s056).

As a result of step s056, the management computer 500 performs the processing of selecting the virtual storage subsystem 100 to become the migration destination of the virtual storage extent 110 determined to be migrated (step s058). Incidentally, a more detailed routine of this selection processing is described later with reference to FIG. 25 to FIG. 31.

The management computers 500 migrates the virtual storage extent to be migrated 110 to the migration destination selected at step s058 (step s060). Incidentally, a more detailed routine of this migration processing is described later with reference to FIG. 32 to FIG. 35.

After the foregoing virtual storage extent migration processing is complete the management computer 500 updates the virtual storage extent configuration information 5113 (step s082).

As a result of step s058, there are three routines in the processing for determining the migration destination of the virtual storage extent 110 determined to be migrated. As the migration destination virtual storage extent, a virtual storage subsystem 100 that can be connected to all host computers to be connected to the migration source virtual storage extent and to the storage subsystem 200 configuring the storage extent 210 configuring the migration source virtual storage extent. The following conditions are adopted in selecting the migration destination apparatus.

Figure 25:
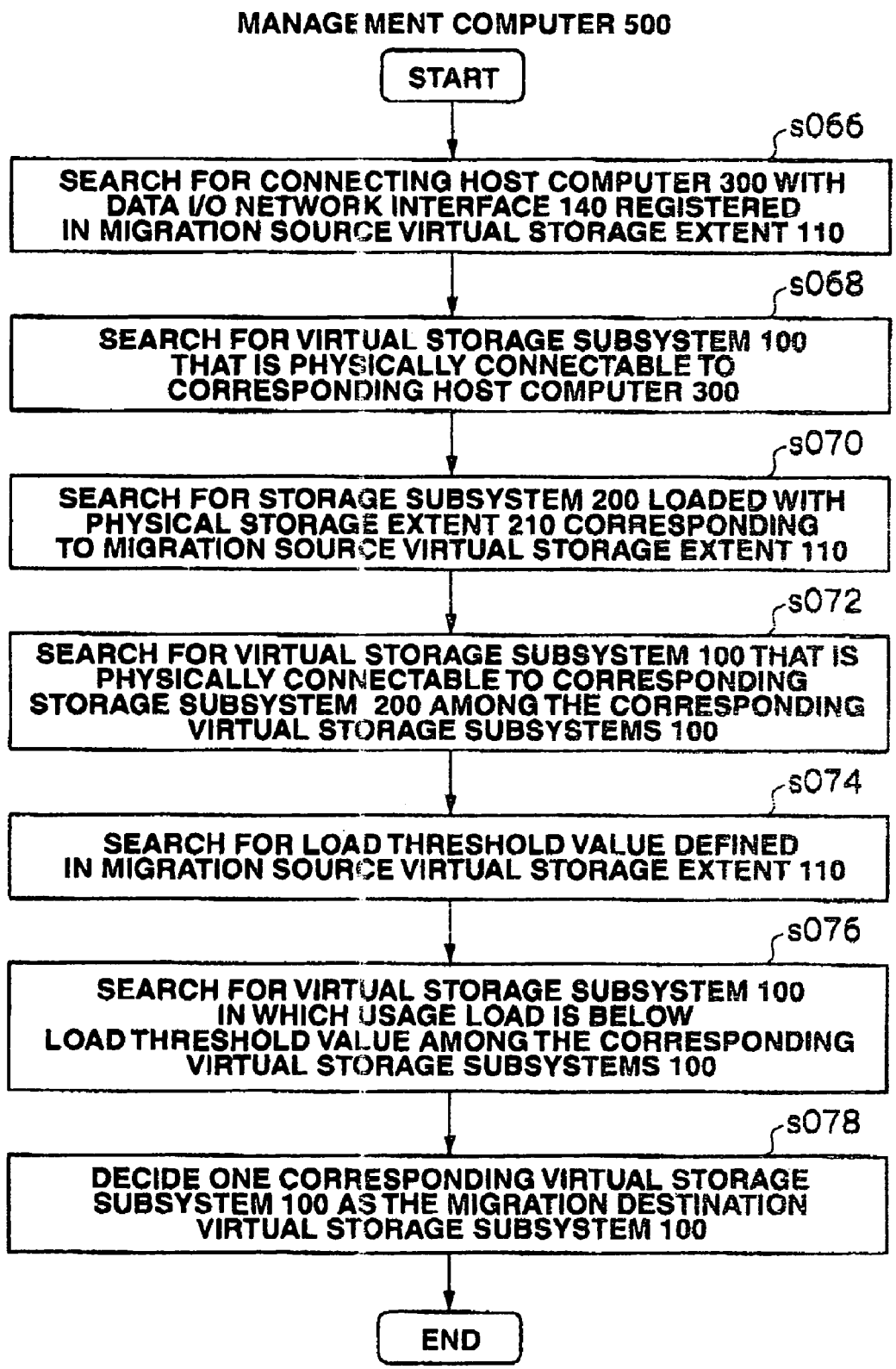
FIG. 25 is a flowchart explaining the migration destination virtual storage subsystem selection processing effective with a physical network configuration.

(1) A virtual storage subsystem 100 connectable to the host computer 300 and the storage subsystem 200 on a physical network configuration is selected (FIG. 25);
(2) A virtual storage subsystem 100 connectable to the host computer 300 and the storage subsystem 200 on a logical network configuration is selected (FIG. 26); and
(3) When there is no virtual storage subsystem 100 that is connectable to the host computer 300 and the storage subsystem 200 on a logical network configuration, the logical network configuration is changed so as to enable the connection to a pre-selected migration destination virtual storage subsystem 100, and this is selected as the migration destination virtual storage subsystem 100 (FIG. 27 to FIG. 31).

FIG. 25 is a flowchart showing a more detailed routine of the migration destination virtual storage subsystem selection processing depicted at step s058 of FIG. 24. FIG. 25 corresponds to the routine of searching for a virtual storage subsystem 100 that is effective in a physically connected configuration upon selecting the migration destination virtual storage subsystem. The processor unit 580 of the management computer 500 uses the storage extent configuration command program 5117 to execute the subsequent processing.

The management computer 500 refers to the virtual storage extent configuration information 5113 and acquires the data 110 network interface 140 associated with the migration source virtual storage extent 110 determined to be migrated at step s055. Further, the management computer 500 refers to the host computer storage extent configuration information 5121 and searches for a host computer 300 that may input and output data to and from the virtual storage extent to be migrated 110 via the data I/O network interface 140 (step s066).

Next, the management computer 500 refers to the physical network configuration information 5101 and searches for a virtual storage subsystem 200 that is physically connectable to the host computer 300 corresponding to the search result at step s066 (step s068).

Further, the management computer 500 refers to the virtual storage extent configuration information 5113 and searches for the storage extent 210 configuring the migration source virtual storage extent 110 determined to be migrated at step s056, and acquires the data I/O network interface 240 associated with the storage extent 210 (step s070).

Next, the management computer 500 refers to the physical network configuration information 5101 and re-searches (search refinement) the virtual storage subsystem 100 that is physically connectable to the data I/O network interface 240 corresponding to the search result at step s070 among the search results at step s068 (step s072).

Further, the management computer 500 refers to the virtual storage extent configuration change condition definition information 5119 and acquires the load threshold value defined in the virtual storage extent to be migrated (step s074).

Next, the management computer 500 refers to the virtual storage extent load information 5115 and researches (search refinement) the data I/O network interface 140 in the virtual storage subsystem 100 in which the load is below the load threshold value acquired at step s074 among the virtual storage subsystems 100 searched at step s072 (step s076).

As a result of the foregoing processing, the management computer 500 determines one of the search results at step s076 to be the migration destination virtual storage subsystem 100 (step s078). When there are several search results at step s078, the management computer 500 may adopt the search result with the smallest load acquired at step s104.

Figure 26:
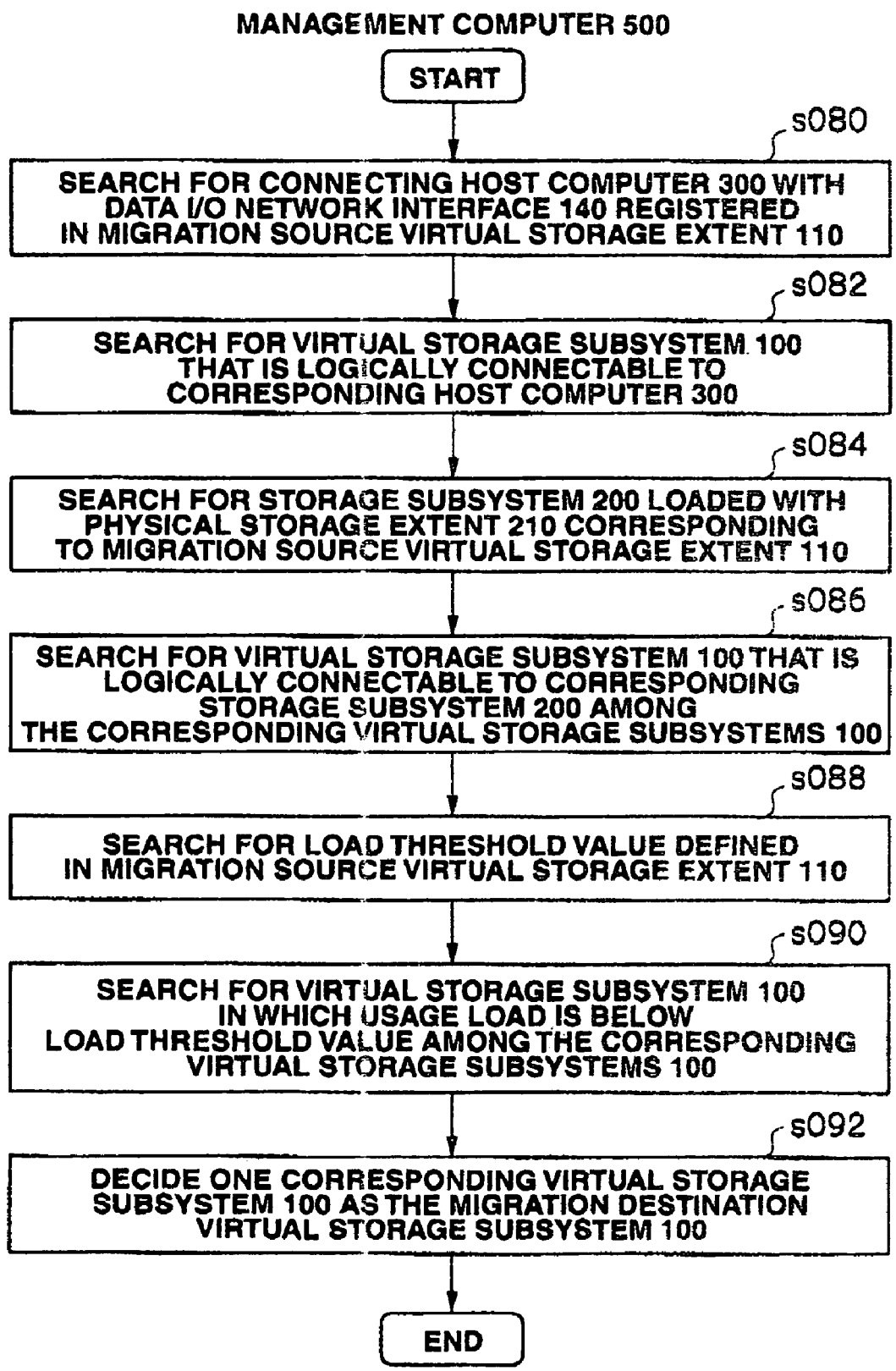
FIG. 26 is a flowchart explaining the migration destination virtual storage subsystem selection processing effective with a logical network configuration.

FIG. 26 is a flowchart showing a more detailed routine of the migration destination virtual storage subsystem selection processing depicted at FIG. 24. FIG. 26 corresponds to the routine of searching for a virtual storage subsystem 100 that is effective in a logically connected configuration upon selecting the migration destination virtual storage subsystem.

Although the processing routine of FIG. 26 is approximate to the processing routine of FIG. 25, the two differ in that a physically connectable apparatus is not searched at step s082 and step s086, and that a logically connectable apparatus is searched by referring to the logical network configuration information 5103.

FIG. 27 to FIG. 31 are flowcharts showing a more detailed routine of the migration destination virtual storage subsystem selection processing depicted at step 8058 of FIG. 24. FIG. 27 to FIG. 31 correspond to the routine of newly creating a virtual storage subsystem 100 that is effective in a logically connected configuration by changing the logical network configuration when there is no virtual storage subsystem 100 that is effective in the logically connected configuration upon selecting the migration destination virtual storage subsystem.

The management computer 500 refers to the virtual storage extent configuration information 5113 and acquires the data I/O network interface 140 associated with the migration source virtual storage extent 110 determined to be migrated at step s056. Further, the management computer 500 refers to the host computer storage extent configuration information 5121 and searches for a host computer 300 that may input and output data to and from the virtual storage extent to be migrated 110 via the data I/O network interface 140 (step s092).

Next, the management computer 500 refers to the logical network configuration information 5103 and searchs for a virtual storage subsystem 200 that is virtually connectable to the host computer corresponding to the search result at step s092 (step s094).

Moreover, the management computer 500 refers to the virtual storage extent configuration information 5113 and searches for the storage extent 210 configuring the migration source virtual storage extent 110 determined to be migrated at step s056, and acquires the data I/O network interface 240 associated with the storage extent 210 (step s096).

Next, the management computer 500 refers to the logical network configuration information 5103 and re-searches (search refinement) a virtual storage subsystem 100 that is logically connectable to the data I/O network interface 240 corresponding to the search result at step s096 among the search results at step s094 (step s098).

As a result of the search processing up to step s098, the subsequent processing is branched off depending on whether or not there is a virtual storage subsystem 100 satisfying the foregoing conditions (step s100).

Figure 28:
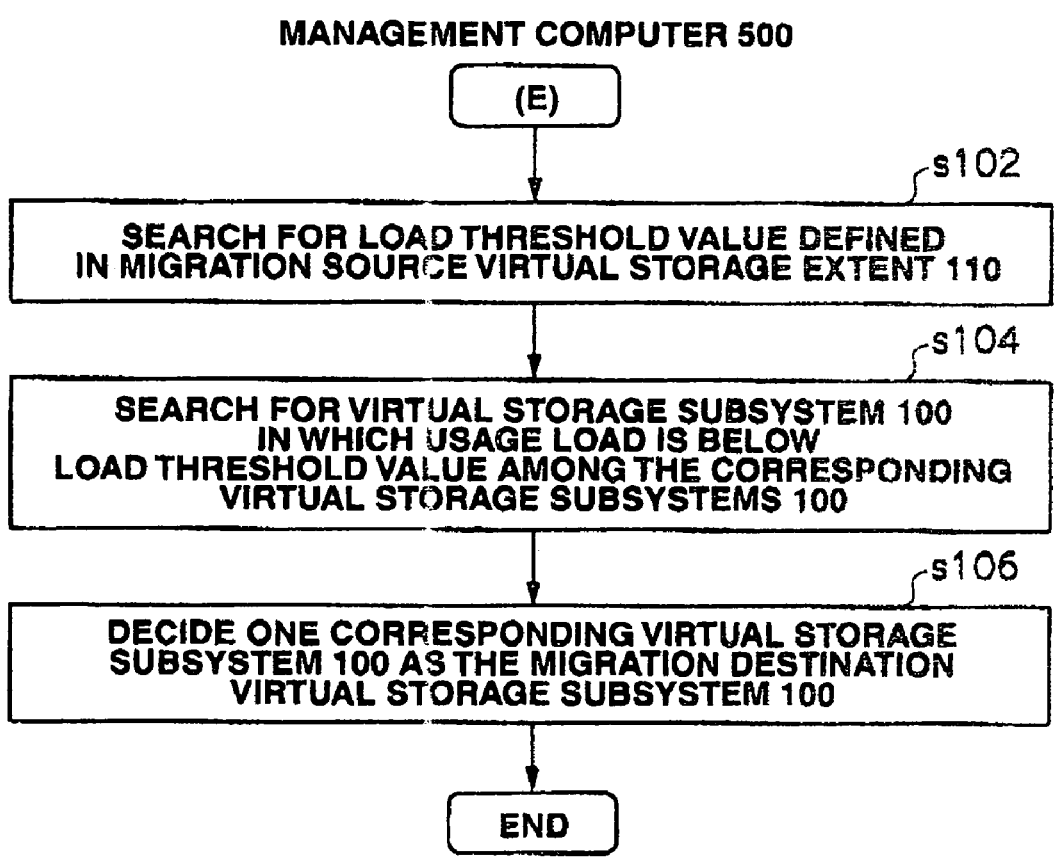
FIG. 28 is a flowchart explaining the migration destination virtual storage subsystem selection processing effective with a logical network configuration.

FIG. 28 is a flowchart showing a case when the result at step s100 is "YES"; that is, when there is a virtual storage subsystem 100 satisfying the conditions as a result of the search processing up to step s098.

The management computer 500 refers to the virtual storage, extent configuration change condition definition information 5119 and acquires the load threshold value defined in the virtual storage extent to be migrated (step s 02).

Next, the management commuter 500 refers to the virtual storage extent load information 5115 and re-searches (search refinement) a data I/O network interface 140 in the virtual storage subsystem 100 in which the load is below the load threshold value acquired at step s102 among the virtual storage subsystems 100 searched at step s098 (step s104).

As a result of the foregoing processing, the management computer 500 determines one of the search results at step s104 to become the migration destination virtual storage subsystem 100 (step s106). When there are a plurality of search results at step s104, the management computer 500 may adopt a search result with the smallest load acquired at step s104. In other words, the processing routine of FIG. 27 and FIG. 28 coincides with the processing routine of FIG. 26.

Figure 29:
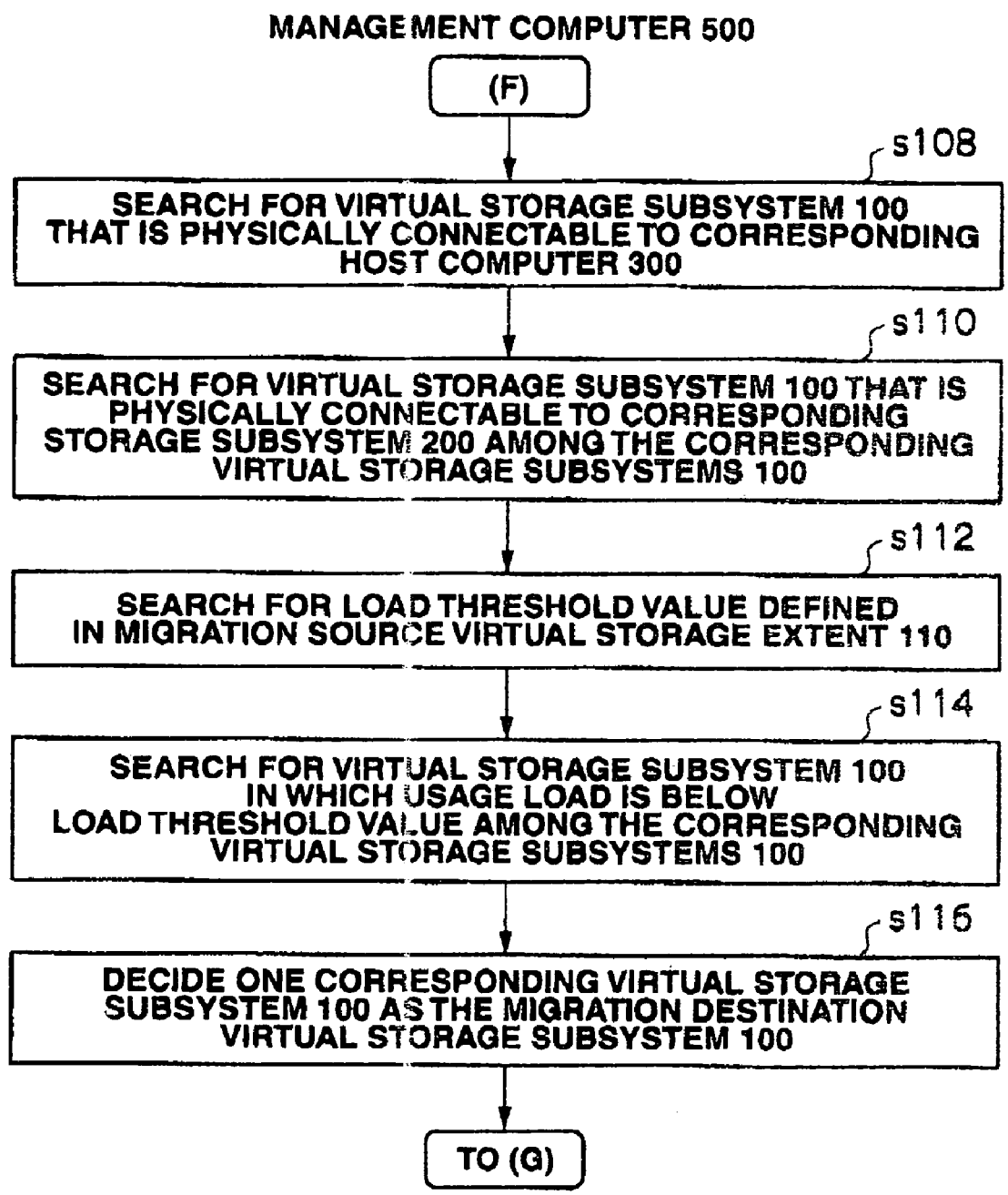
FIG. 29 is a flowchart explaining the migration destination virtual storage subsystem selection processing effective with a physical network configuration.

FIG. 29 is a flowchart showing a case when the result at step s100 is "NO"; that is, when there is no virtual storage subsystem 100 satisfying the conditions as a result of the search processing up to step s098. Hereafter, in FIG. 29 to FIG. 31, processing for changing the logical network configuration and activating the connection to the migration destination virtual storage subsystem 100 is executed, The management computer 500 refers to the physical network configuration information 5101 and searches for a virtual storage subsystem 100 that is physically connectable to all host computers 300 searched at step s092 (step s108).

Similarly, the management computer 500 refers to the physical network configuration information 5101 and researches (search refinement) a virtual storage subsystem 100 that is physically connectable to the storage subsystem 200 searched at step s096 among the virtual storage subsystems 100 searched at step 5108 (step s110).

Next, the management computer 500 refers to the virtual storage extent configuration change condition definition information 5119 and acquires the load threshold value defined in the migration source virtual storage extent 110 (step s112).

Further, the management computer 500 refers to the virtual storage extent load information 5115 and researches (search refinement) a virtual storage subsystem 100 in which the used load thereof is below the load threshold value acquired at step s112 among the virtual storage subsystems 100 searched at step s110 (step s114).

The management computer 500 decides one virtual storage subsystem 100 searched at step s114 to become the migration destination (step s116) when there are a plurality of search results at step s114, the management computer 500 may select the search result with the smallest used load as the migration destination.

Figure 30:
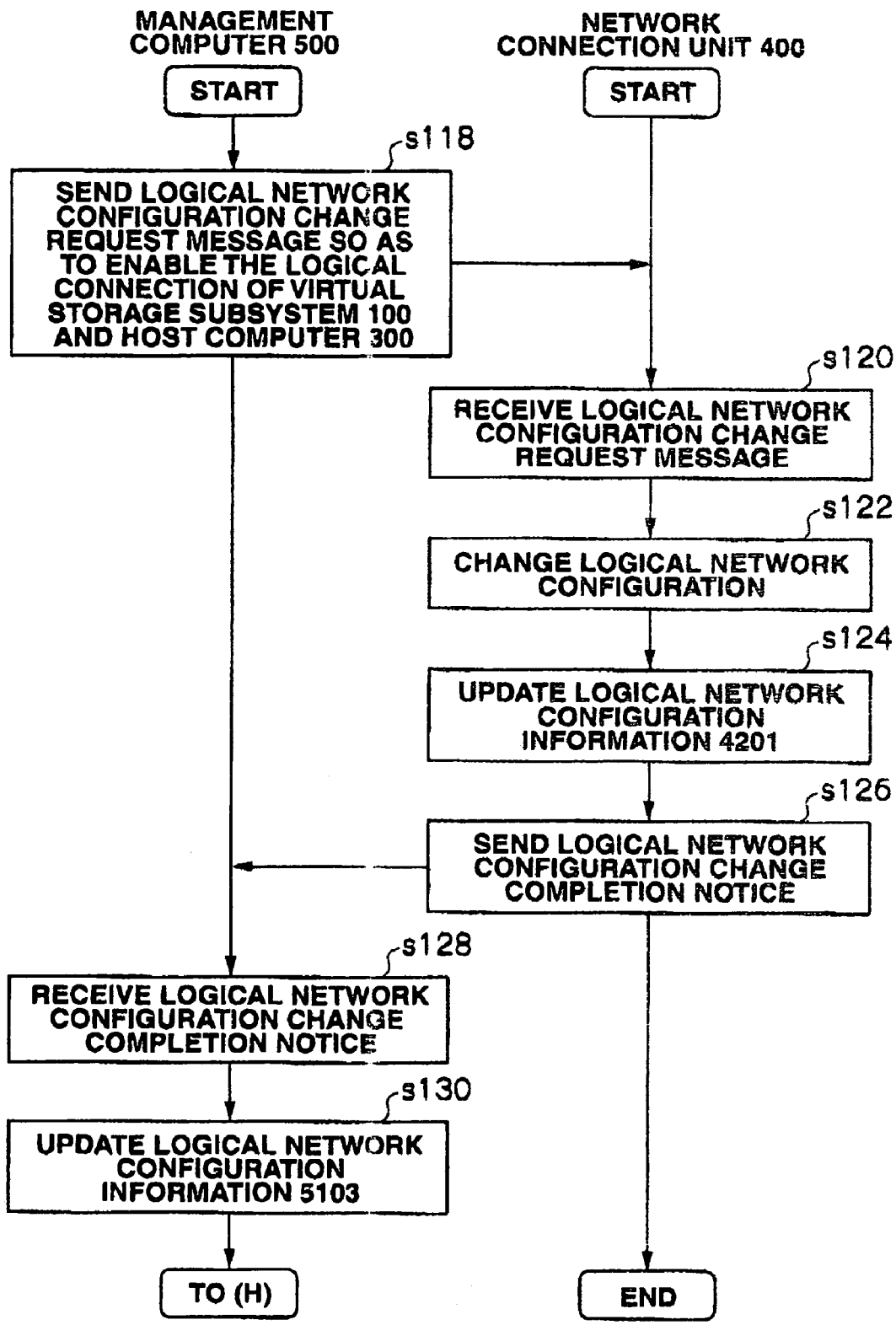
FIG. 30 is a flowchart explaining the logical network configuration change processing.

FIG. 30 is a flowchart of processing for changing the logical network configuration so that the migration destination virtual storage subsystem 100 decided at step s116 can be logically connected to the host computer 300 searched at step s092.

The management computer 500 sends to the network connection unit 400 a logical network configuration change request message so that the data I/O network interface 140 in the migration destination virtual storage subsystem 100 and the data I/O network interface 340 in the host computer 300 can communicated.

The network connection unit 400 receives the logical network configuration change request message (step s120).

Further, the network connection unit 400 changes the logical network configuration as described in the request message (step s122), and simultaneously updates the logical network configuration information 4201 (step s124).

The network connection unit 400 sends a logical network configuration change completion notice (step s126). As one form of such completion notice, for instance, an "acknowledged message" may be used.

The management computer 500 receives the logical network configuration change completion notice (step s128), and simultaneously updates the logical network configuration information 5103 so as to represent the changed configuration.

Figure 31:
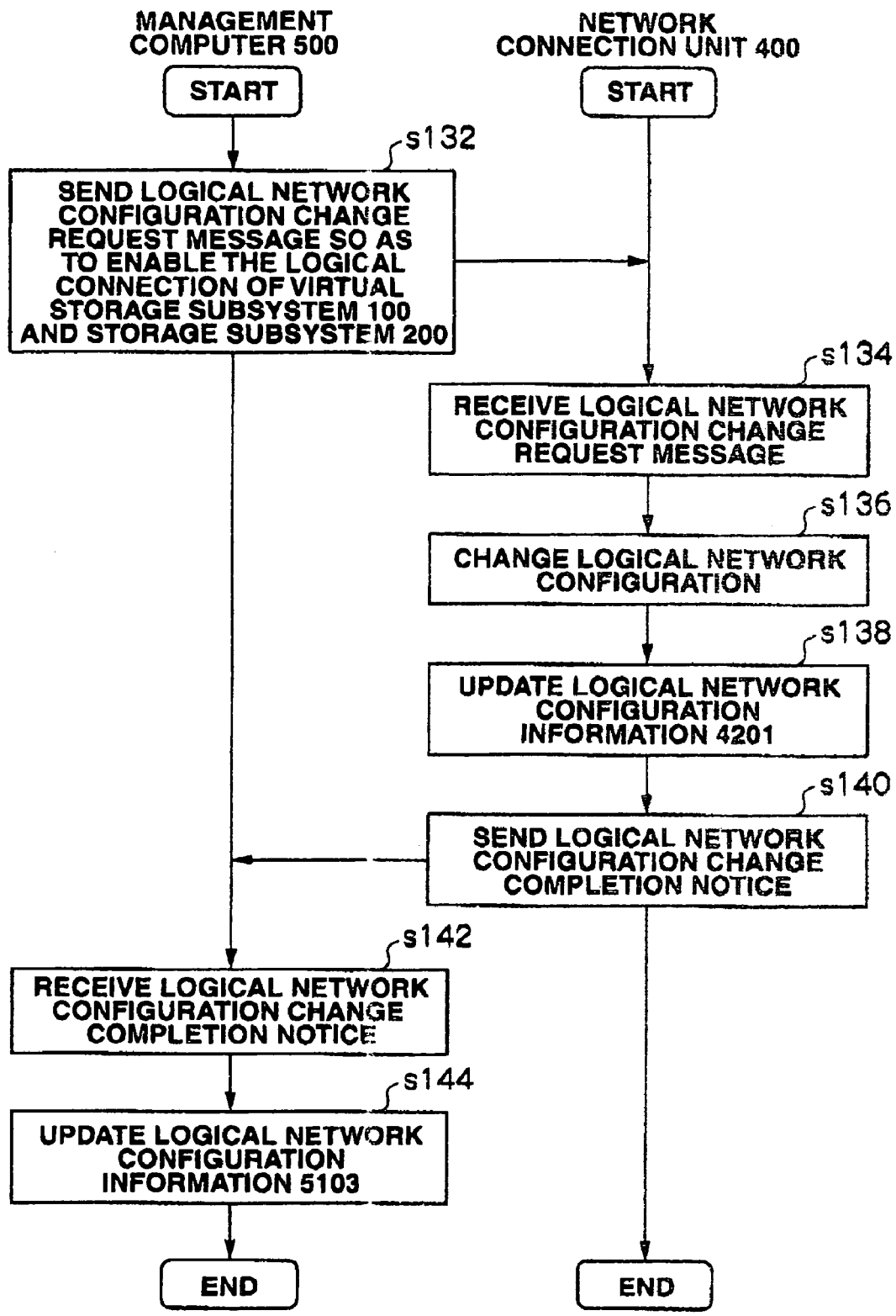
FIG. 31 is a flowchart explaining the logical network configuration change processing.

FIG. 31 is a flowchart of processing for changing the logical network configuration so that the migration destination virtual storage subsystem 100 decided at step s116 can be logically connected to the storage subsystem 200 searched at step s096. The respective processing steps of FIG. 31 may be the same as those illustrated in FIG. 30.

Next, the processing routine of FIG. 27 to FIG. 31 is explained in more detail using specific examples of this embodiment. At step s066, when the load of the data I/O network interface 1406 (indicated in FIG. 13) to which the virtual storage extent 114 of "D" is to be connected reaches "90%" (indicated in FIG. 17), the management computer 500 obtains a determination result that such load is exceeding the threshold value of "50%" (indicated in FIG. 18) An example of the migration processing (step s068) of the virtual storage extent 114 of "D" is described below.

Figure 27:
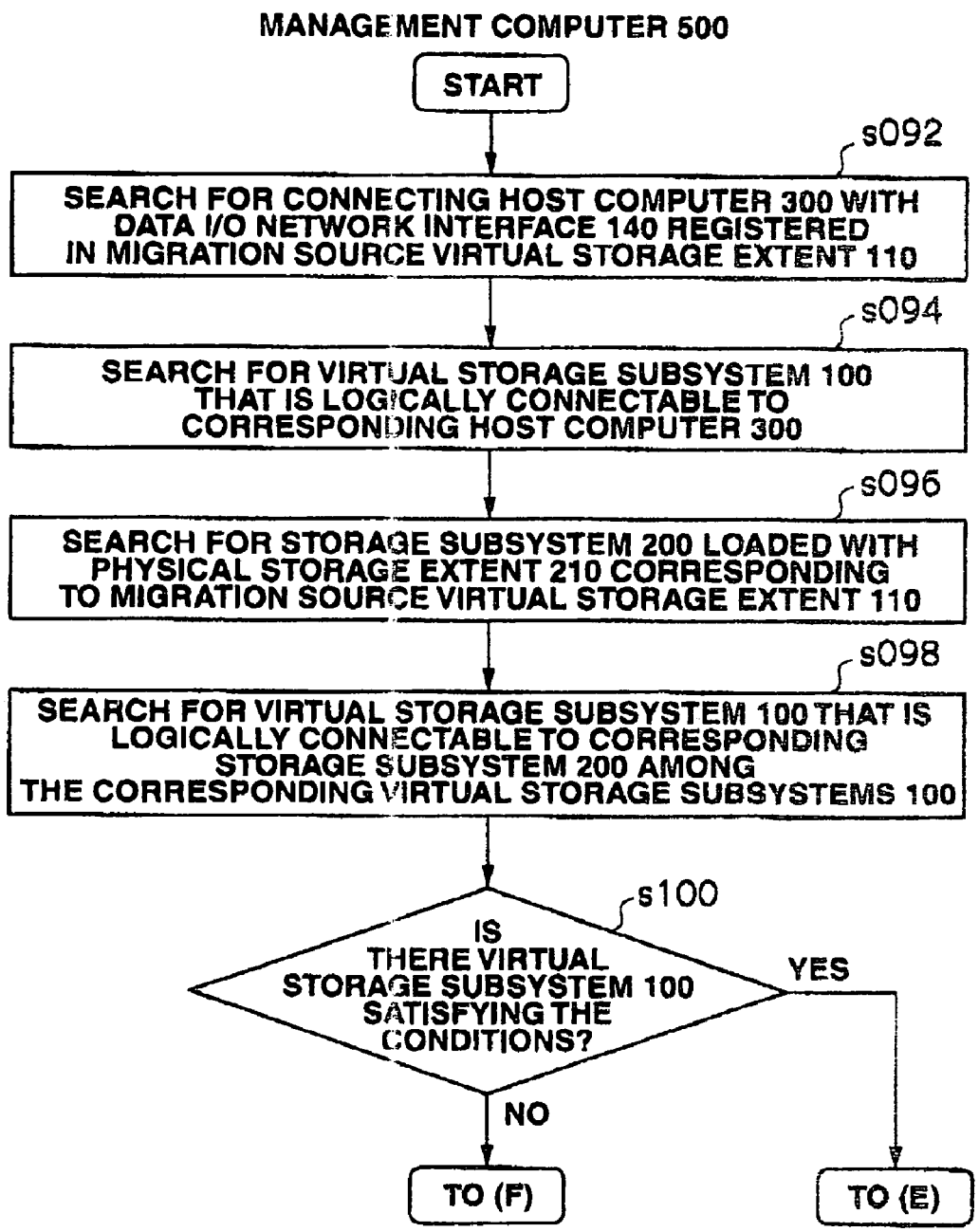
FIG. 27 is a flowchart explaining the migration destination virtual storage subsystem selection processing effective with a logical network configuration.

In FIG. 27, the management computer 500, at step s092, checks whether the host computer 300 to which the date I/O network interface 1406 of the virtual storage extent 114 of "D" is the host computer 302 (indicated in FIG. 19).

At step s094, the management computer 500 checks whether the virtual storage subsystem 100 that is logically connectable to the host computer 302 is the data I/O network interface 1402 (indicted in FIG. 15, FIG. 16).

At step s096, the management computer 500 checks whether the storage subsystem 200 loaded with the storage extent configuring the virtual storage extent 114 of "D" is the storage subsystem 202 (indicated in FIG. 13).

At step s098 and s100, the management computer 500 proceeds to FIG. 29(F) since the virtual storage subsystem 102 as the result at step s094 cannot be connected to the storage subsystem 202 as the result at step s096 on the logical network configuration (indicated in FIG. 16, FIG. 3).

In FIG. 29, at step s108, the management computer 500 checks whether the virtual storage subsystem 100 that is physically connectable to the host computer 102 is the virtual storage subsystem 102 (indicated in FIG. 15).

At step s10, since the virtual storage subsystem 102 is physically connectable to the storage subsystem 102 (indicated in FIG. 15), the management computer 500 leaves the virtual storage subsystem 102 as a search result.

At step s112, the management computer 500 acquires the load threshold value "50%" of the migration source virtual storage extent 114 of "D" (indicated in FIG. 18).

At step s114, the management computer 500 recognizes that the data I/O network interface 1408 has a used load that is below "50%" among the virtual storage subsystems 102 (data I/O network interfaces 1402) (indicated in FIG. 17).

At step s116, the management computer 500 leaves the data 110 network interface 1408 in the search result as the migration destination virtual storage subsystem. The management commuter 500 then uses the remaining virtual storage subsystem 102 and data 110 network interface 1408 as the migration destination.

In FIG. 30, the management computer 500, at step s118, requests the network connection unit 402 to change the logical network configuration in order to connect the data I/O network interfaces 4409 and 4404 or 4406 so that the data I/O network interface 1408 can be connected to the host computer 302.

At step s122, the network connection unit 402 adds the data i/O network interface 4409 to the logical network 422.

At step s124, the network connection unit 402 adds the data 110 network interface 4409 to the logical network 422 of the logical network configuration information 4201.

At step s130, similar to the above, the management computer 500 updates the logical network configuration information.

In FIG. 31, the management computer 500, at step s132, requests the network connection unit 403 to change the logical network configuration in order to connect the data I/O network interfaces 4412 and 4416 so that the data I/O network interface 4412 can be connected to the data I/O network interface 2403.

At step s136, the network connection unit 403 adds the data I/O network interface 4412 to the logical network 425.

At step s138, the network connection unit 403 adds the data I/O network interface 4412 to the logical network 425 of the logical network configuration information 4201.

At step s140, similar to the above, the management computer 500 updates the logical network configuration information. As a result of the foregoing operation, the logical network configuration illustrated in FIG. 3 will be changed to the logical network configuration illustrated in FIG. 4.

FIG. 32 to FIG. 35 are flow charts of processing for changing the configuration of the virtual storage subsystem 100, the storage subsystem 200, and the host computer 300 and migrating the migration source virtual storage extent to the migration destination virtual storage extent.

Figure 32:
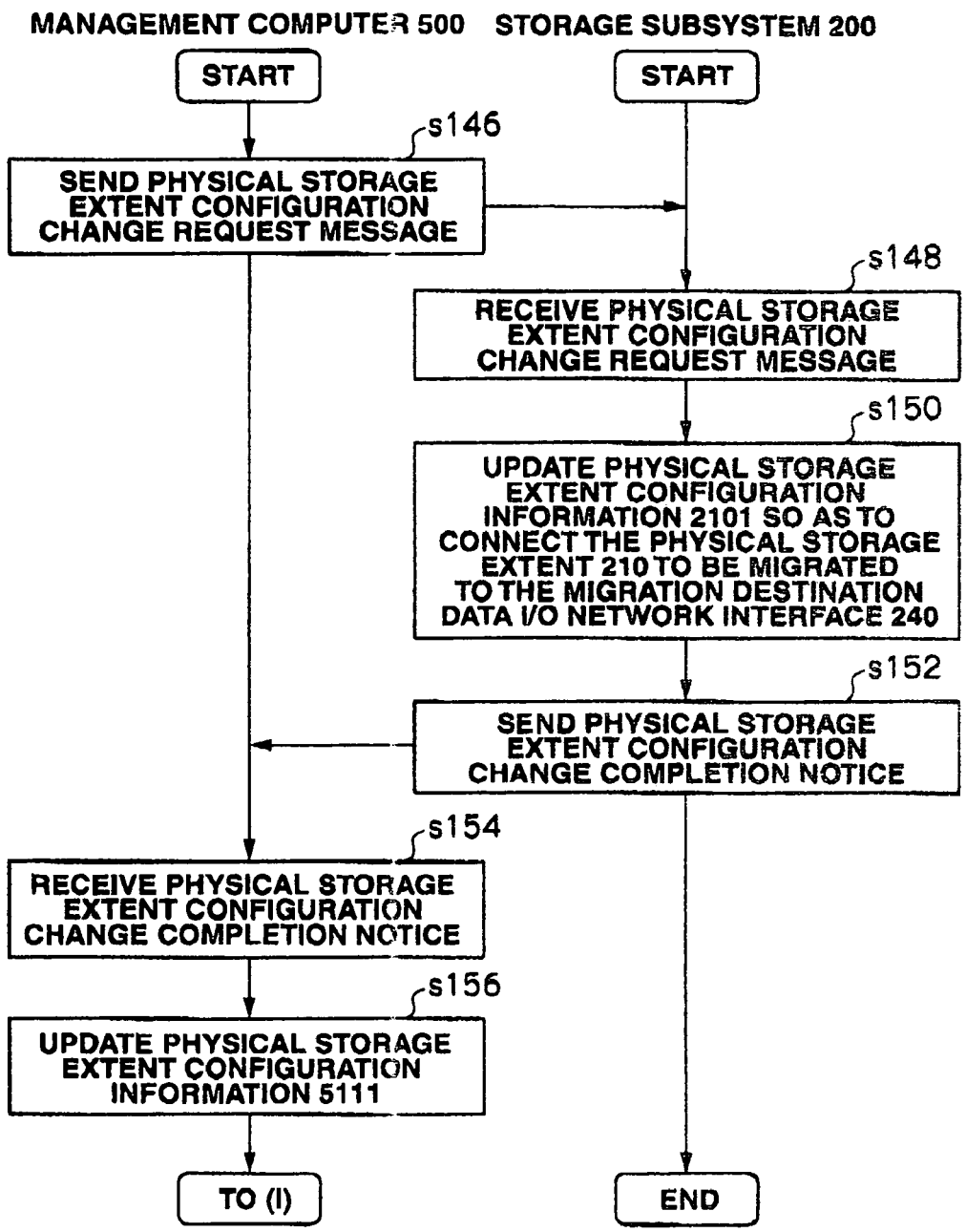
FIG. 32 is a flowchart explaining the storage extent configuration change processing.

FIG. 32 is a flowchart of processing for changing the configuration of the storage subsystem 200 in order to migrate the virtual storage extent 110.

The management computer 500 sends a storage extent configuration change request message to the storage subsystem 200 loaded with the storage extent 210 configuring the virtual storage extent to be migrated 110 so as to make the data I/O network interface 240 connected to the storage extent 210 to become the data I/O network interface 240 to be connected to the migration destination virtual storage extent 110 (step s146). The message may be configured with storage extent identifying information and migration destination data I/O network interface identifying information.

The storage subsystem 200 receives the storage extent configuration change request message (step s148).

The storage subsystem 200 executes the storage extent configuration change program 2103 and changes the data I/O network interface 240 connected to the storage extent 210 as the data I/O network interface 240 to be connected to the migration destination virtual storage extent as described in the message (step s150). The storage subsystem 200 additionally updates the storage extent configuration information 2101. Incidentally, with the storage subsystem 200, although the association with the data I/O network interface 240 to be connected to the migration source virtual storage subsystem 100 will be cancelled, this does not have to be executed immediately, and may be executed after the completion of the sequential migration up to FIG. 35.

The storage subsystem 200 sends a storage extent configuration change completion notification (step s152).

The management computer 500 receives the storage extent configuration change completion notification (step s154), and updates the storage extent configuration information 5111.

As a result of the foregoing processing illustrated in FIG. 32, the storage extent 210 will be connected to the data I/O network interface 240 to be connected to the migration destination virtual storage extent 110.

Figure 33:
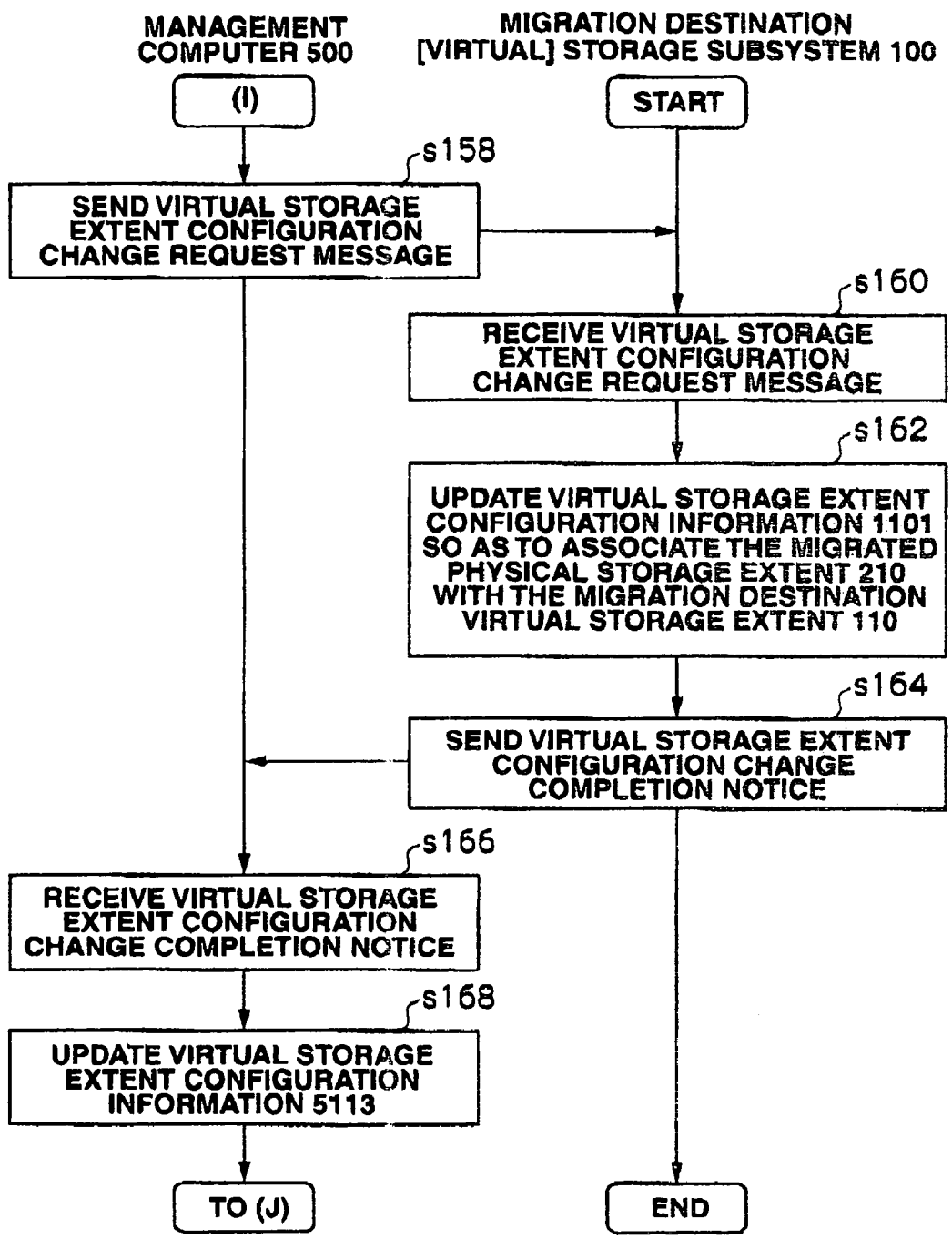
FIG. 33 is a flowchart explaining the virtual storage extent configuration change processing.

FIG. 33 is a flowchart of processing for changing the configuration of the migration destination virtual storage subsystem 100 in order to migrate the virtual storage extent 110.

The management computer 500 sends to the migration destination virtual storage subsystem 100 a virtual storage extent configuration change request message for associating the storage extent 210 which became connectable at step s150 with the migration destination virtual storage extent 110 (step s158). The virtual storage extent configuration change request message may be configured with the identifying information of the storage extent 210 to be associated with the virtual storage extent identifying information of the migration destination, and the data i/O network interface 240 of the storage extent 210. The subsequent processing is the same as steps s148 to step s156 of FIG. 32.

As a result of the foregoing processing illustrated in FIG. 33, the migration destination virtual storage extent 110 will be configured with the storage extent 210 configuring the migration source virtual storage extent 110.

Figure 34:
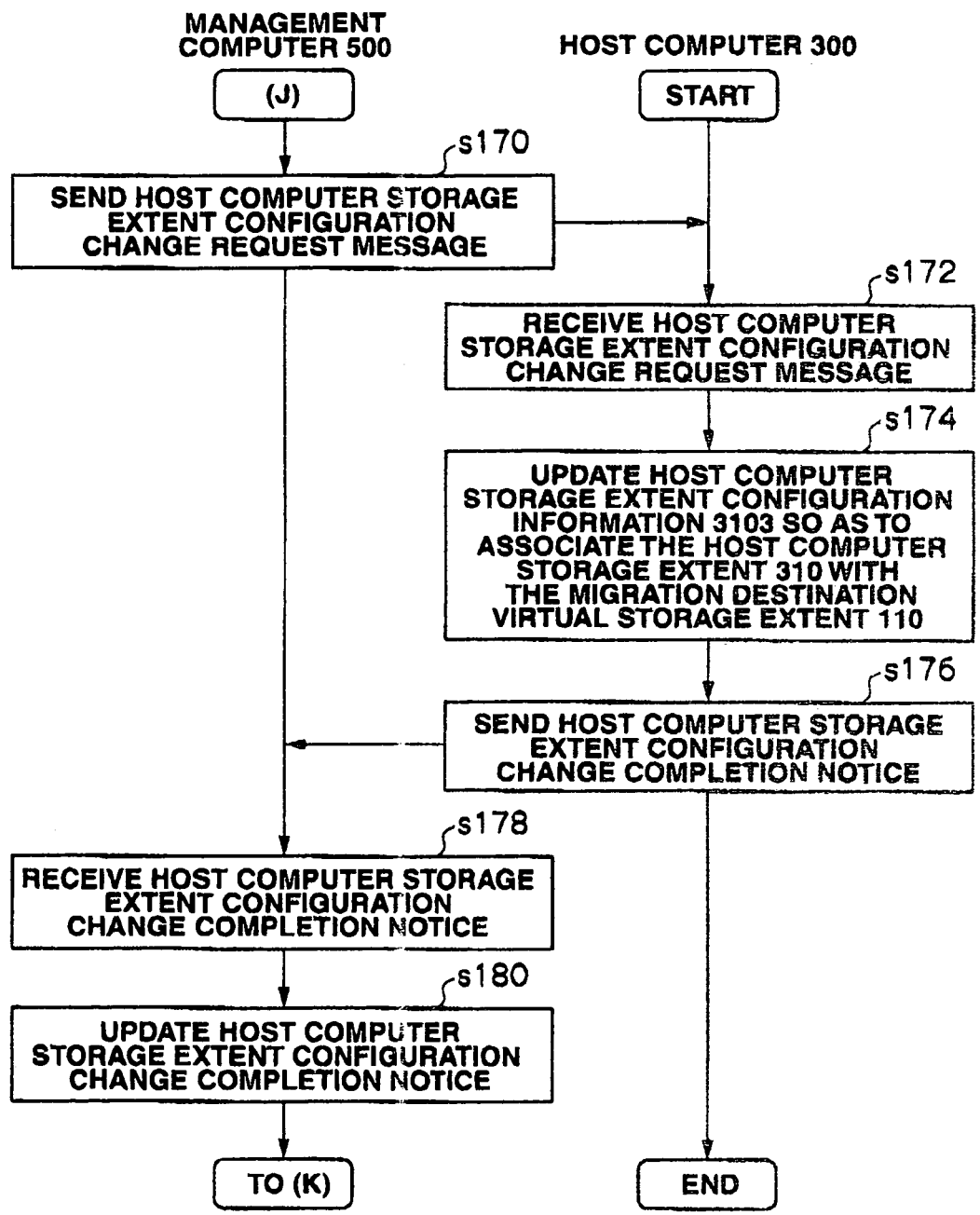
FIG. 34 is a flowchart explaining the host computer storage extent configuration change processing.

FIG. 34 is a flowchart of processing for changing the configuration of the host computer 300 so that the connection destination of the host computer storage extent 310 of all host computers connected to the virtual storage extent to be migrated 110 will become the migration destination virtual storage extent 110.

The management computer 500 sends a host computer storage extent configuration change request message to all host computers 300 connected to the virtual storage extent to be migrated so that the connection destination of the host computer storage extent 310 connected to the virtual storage extent to be migrated will become the migration destination virtual storage extent (step s170). The host computer storage extent configuration change request message may be configured with identifying information of the host computer storage extent 310 to be migrated. Identifying information of the migration destination virtual storage extent, and the data I/O network interface connected to the migration destination virtual storage extent. The subsequent processing is the some as step s148 to step s156 of FIG. 32.

As a result of the foregoing processing illustrated in FIG. 34, all host computer storage extents 310 connected to the virtual storage extent to be migrated 110 will configure the migration destination virtual storage extent 110.

Figure 35:
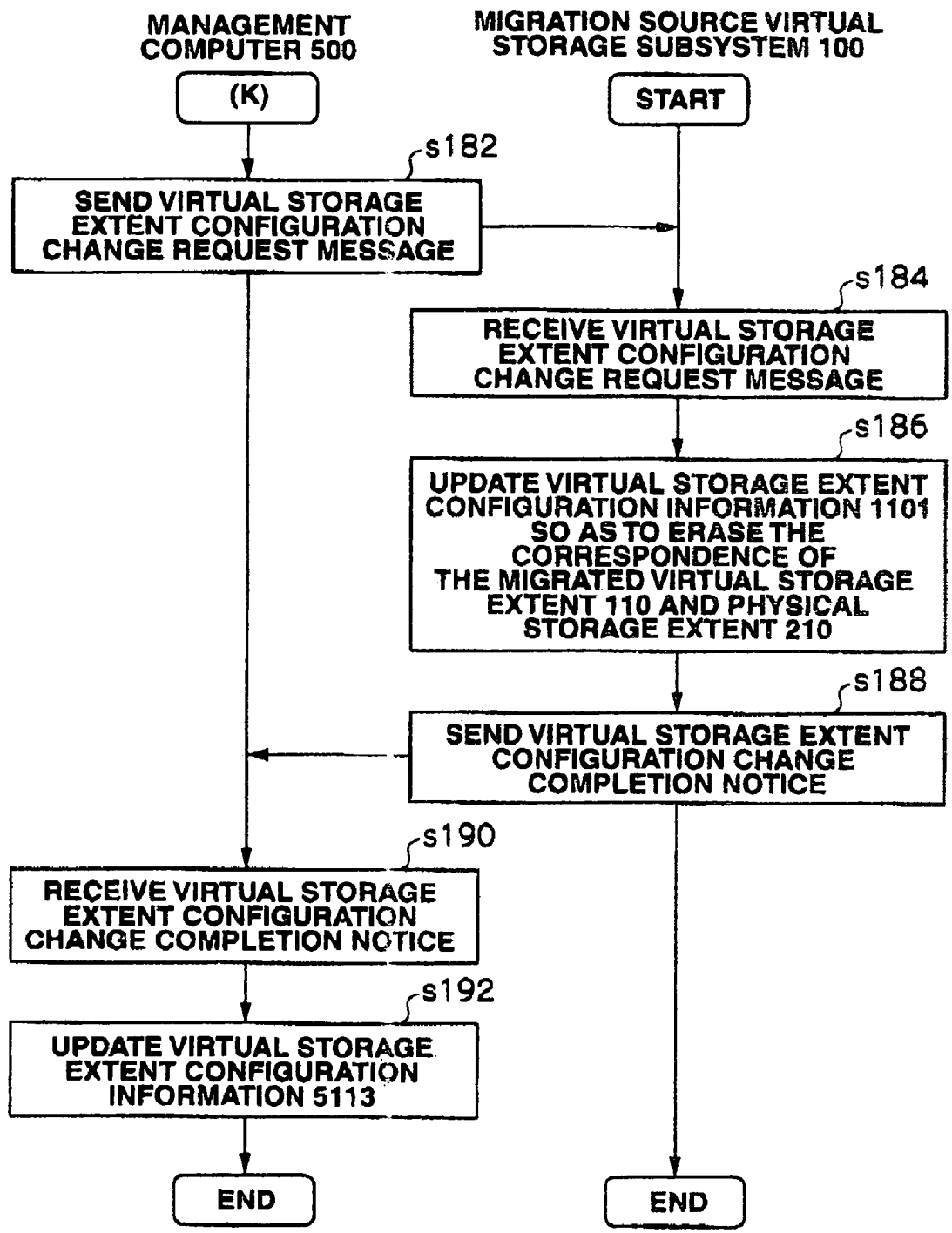
FIG. 35 is a flowchart explaining the virtual storage extent configuration change processing.

FIG. 35 is a flowchart of processing for changing the configuration of the virtual storage subsystem 100 so as to eliminate the association of the migration source virtual storage extent 110 and the storage extent 210 configuring the virtual storage extent 110, and delete the migration source virtual storage extent.

The management computer 500 sends a virtual storage extent configuration change request message to the migration source virtual storage subsystem 100 for deleting the relation of the migration source virtual storage extent and the storage extent (step s182). The virtual storage extent configuration change request message may be configured with virtual storage extent identifying information representing the migration source. The subsequent processing is the same as step s148 to step s156 of FIG. 32.

As a result of the foregoing processing illustrated in FIG. 35 entries corresponding to the virtual storage extent of the migration source will be eliminated from the virtual storage extent configuration information 5113.

As a result of the foregoing processing illustrated in FIG. 32 to FIG. 35, migration of the virtual storage extent 110 is completed. Based on the foregoing operation, the storage extent configuration illustrated in FIG. 3 will be changed to the storage extent configuration illustrated in FIG. 4.

Like this, with the computer system 1, a management computer 500 is introduced for governing the migration of the virtual storage extent 110 among the virtual storage subsystems 100 and the control of the network configuration. The management computer 500 monitors the load of the virtual storage extent 110, and, when it determines that rearrangement is required among the virtual storage subsystems 100, it selects a virtual storage subsystem 200 that can be connected to all I/O devices connected to the virtual storage extent to be migrated 110 as the migration destination. Further, with the computer system 1, the network configuration is changed (optimized) to enable to connection of all I/O devices to the migration destination virtual storage subsystem 100.

Like this, it is possible to guarantee the input and output of data as before the migration even after the virtual storage extent 110 is migrated.

In other words, with the computer system 1, whether the load of the virtual storage extent 110 recorded in the virtual storage extent load information 5115 is greater than the threshold value recorded in the virtual storage extent configuration change condition definition information 5119 is determined, and, if the observed load is determined to be exceeding the threshold value as a result of the foregoing determination, a virtual storage system 100 that is connectable to the host computer 300 and storage subsystem 200 on a physical network configuration is selected, and a virtual storage extent 110 having a high load factor is migrated to a virtual storage subsystem 100 having a low load factor.

Further, with the computer system 1, when there is a function of partitioning the network into logical areas, whether the load of the virtual storage extent 110 recorded in the virtual storage extent load information 5115 is greater than the threshold value recorded in the virtual storage extent configuration change condition definition information 5119 is determined, and, if the observed load is determined to be exceeding the threshold value as a result of the foregoing determination, a virtual storage system 100 that is connectable to the host computer 300 and storage subsystem 200 on a logical network configuration is selected, and a virtual storage extent 110 having a high load factor is migrated to a virtual storage subsystem 100 having a low load factor.

Further, with the computer system 1, in a case where there is a function for partitioning the network into logical areas, if there is no virtual storage subsystem 100 that can be connected to the host computer 300 and storage subsystem 200 on a logical network configuration, the logical network configuration is changed so as to connect to a pre-selected migration destination virtual storage subsystem 100, and this is selected as the migration destination virtual storage subsystem 100, and a virtual storage extent 110 having a high load factor is migrated to a virtual storage subsystem 100 having a low load factor.

Accordingly, the load of the virtual storage extent 110 will constantly be below a certain level, and it is therefore possible to maintain the data I/O performance at a certain level or higher. Further, upon migrating the virtual storage extent 110, since it is possible to reliably connect, even after the migration, the host computer 300 and storage subsystem 200 that were connected to the virtual storage extent 110 before the migration, it is possible to guarantee the dependability of input and output of data. Further, since it is possible to integrate the configuration change operation of the storage subsystem 200 and the Configuration change operation of the network connection unit 400 which were conventionally performed separately, it is possible to avoid inconsistencies in the configuration and reduce management costs.

Figure 36:
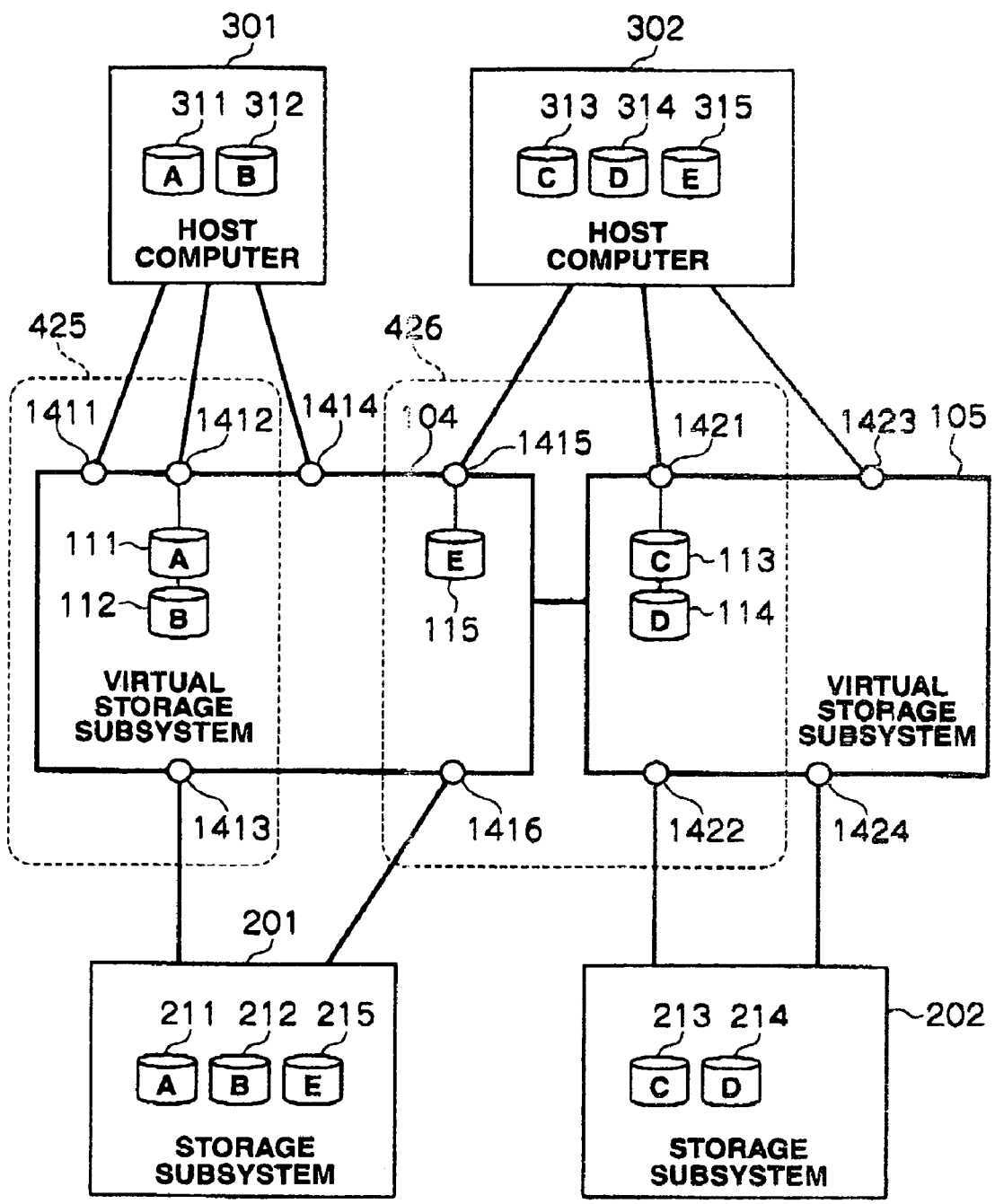
FIG. 36 is a schematic diagram showing a configuration of another storage network.
Figure 37:
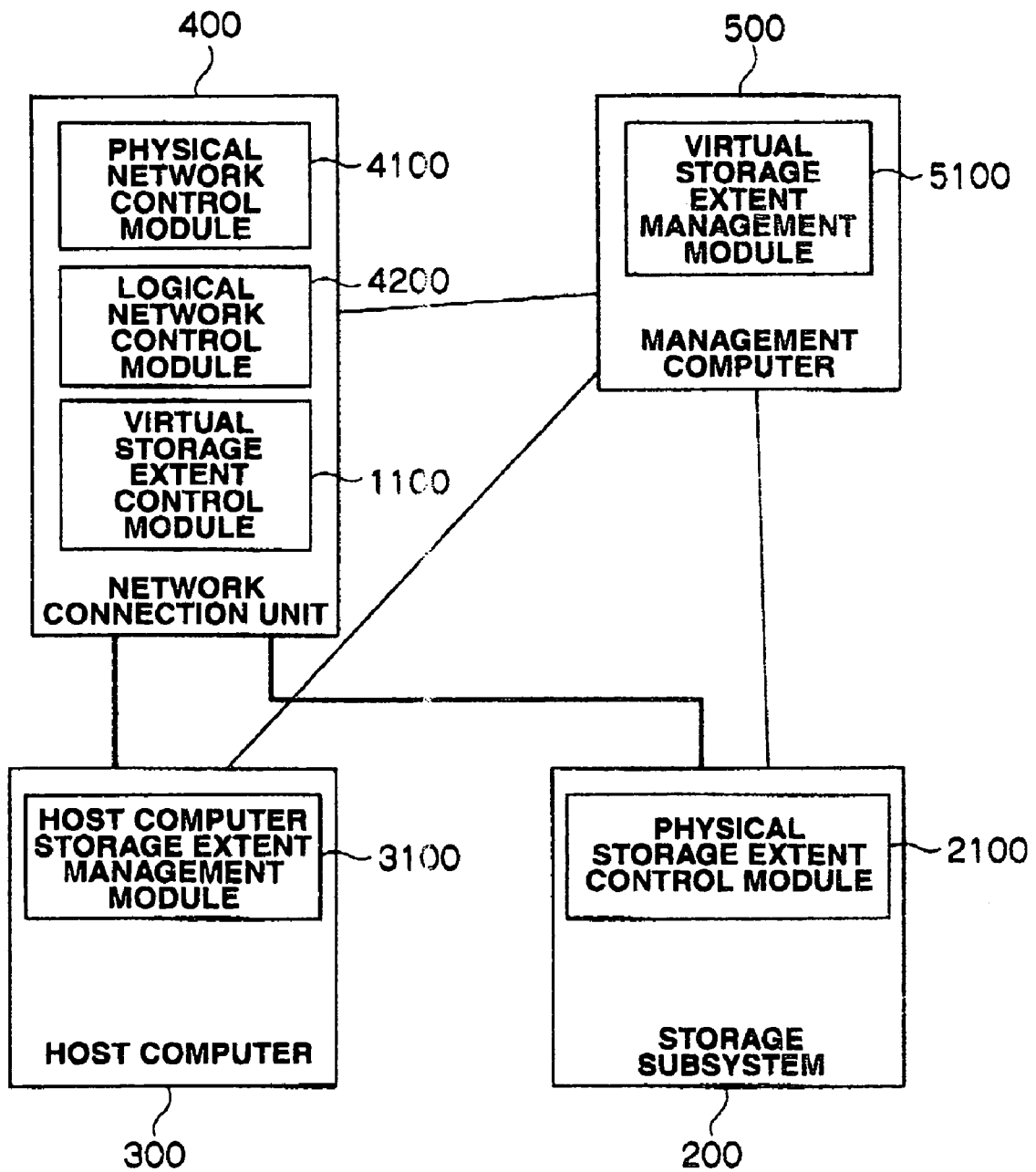
FIG. 37 is a schematic diagram showing a functional layout example of a configuration of another storage network.

Incidentally, FIG. 36 shows a configuration example of an embodiment where the virtual storage subsystem 100 operates as a single apparatus by doubling the function of the network connection unit 400. In this embodiment, as shown in FIG. 37, the virtual storage subsystem 100 has a virtual storage extent control module 1100. All effects of the present invention are achievable even with this kind of function sharing. Further, this embodiment is the same as the embodiment where the network connection unit 400 operates as a single apparatus doubling the function of the virtual storage subsystem 100. For instance, a switching apparatus such as a fibre channel switch or virtualization switching apparatus may be used as the network connection unit 400.

The present invention can be applied to a computer system seeking to equilibrating the load by optimally arranging the storage extents as a result of optimally changing the network configuration so that all I/O devices connected to the virtual storage extent can also be reliably connected to the migration destination virtual storage subsystem upon migrating the virtual storage extent among the virtual storage subsystems.

We claim:

1. A virtual storage subsystem, comprising:
    a plurality of storage subsystems each having a storage interface for storing data sent from a plurality of host computers, said data being stored in a storage extent;
    a plurality of virtual storage subsystems each providing a virtual storage extent associated with said storage extent and each having a first virtual storage interface and a second virtual storage interface;
    a management unit having stored therein performance information indicative of a utilization rate of each of the first virtual storage interfaces and logical network configuration information indicating in which logical networks each of the first virtual storage interfaces and each of the second virtual storage interfaces is included,
    a migration unit; and
    a migration command unit,
    wherein when performance of a first virtual storage subsystem that is in communication a first host computer and a first storage subsystem exceed a threshold value, said migration command unit selects a second virtual storage subsystem that can also communicate with said first host computer and said first storage subsystem, said second virtual storage subsystem having a first and second virtual storage interface determined in accordance with the logical network configuration information and, wherein said migration command unit issues a migration command to migrate a selected virtual storage extent provided by said first virtual storage system to said second virtual storage system, and said migration unit migrates the selected virtual storage extent provided by said first virtual storage subsystem to said second virtual storage subsystem.

2. The virtual storage subsystem according to claim 1, wherein said first virtual storage subsystem and second virtual storage subsystem are physically connected to said first host computer and to a first storage subsystem.

3. The virtual storage subsystem according to claim 1, wherein said second virtual storage subsystem is logically connected to said first host computer via a first connection unit and is logically connect to said first storage subsystem via a second connection unit, wherein said first virtual storage subsystem is logically connected to said first host computer and to a first storage subsystem.

4. The virtual storage subsystem according to claim 3, wherein when there is no second virtual storage subsystem that can communicate with said first host computer and said first storage subsystem, then said logical network configuration information is changed so that said second virtual storage subsystem can he selected by said migration control unit, said migration control unit being communicatively coupled to said first host computer and said first storage subsystem.

5. The virtual storage subsystem according to claim 1, wherein said performance information includes an interface utilization rate, wherein an interface utilization rate of said second virtual storage subsystem is less than an interface utilization rate of said first virtual storage subsystem.

6. A management computer, comprising:

a management unit for managing a plurality of storage subsystems having a physical storage extent for storing data sent from a plurality of host computers and a plurality of virtual storage subsystems for providing a virtual storage extent associated with said physical storage extent to said host computers, each storage subsystem comprising a storage interface and each of said virtual storage subsystems comprising a first virtual storage interface and a second virtual storage interface, wherein the management computer includes performance information indicative of a utilization rate of each of the first virtual storage interfaces and logical network configuration information indicating in which logical networks each of the first virtual storage interfaces and each of the second virtual storage interfaces is included, the management computer is configured to detect when a utilization rate of a first virtual storage subsystem exceeds a threshold value based on the performance information, the management computer is further configured to select one of said host computers included in a first logical network comprising the first virtual storage interface of the first virtual storage subsystem and to select a storage interface included in a second logical network comprising the second virtual storage interface of the first virtual storage subsystem, the management computer is configured to search for a second virtual storage subsystem having a first virtual storage interface that is included in a third logical network comprising the selected host computer and having a second virtual storage interface included in a fourth logical network comprising the selected storage interface based on the logical network configuration information, wherein said virtual storage subsystems include a migration unit for migrating a first virtual storage extent of said first virtual storage subsystem to said second virtual storage subsystem.

7. The management computer according to claim 6, wherein said first virtual storage subsystem and second virtual storage subsystem are physically connected to said first host computer and to a first storage subsystem.

8. The management computer according to claim 6, wherein said second virtual storage subsystem is logically connected to said first host computer via a first connection unit and is logically connect to a first storage subsystem via a second connection unit, wherein said first virtual storage subsystem is logically connected to said first host computer and to said first storage subsystem.

9. The management computer according to claim 8, wherein when the second virtual storage subsystem is not found among said plurality of virtual storage subsystems, then the management computer sends a command to change said system configuration information, wherein said first connection unit and second connection unit change their respective configurations according to the changed logical network configuration information to configure a third virtual storage subsystem having a first virtual storage interface included in the third logical network and a second virtual storage interface included in the fourth logical network.

10. The management computer according to claim 6, wherein a utilization rate of said second virtual storage subsystem is less than a threshold value and the utilization rate of said first virtual storage subsystem.

11. The management computer according to claim 10, wherein the utilization rate of said second virtual storage subsystem is the lowest among the utilization rates of all of said virtual storage subsystems.

12. A computer system, comprising:

a plurality of storage subsystems each having at least one physical storage extent for storing data sent from a plurality of host computers and a storage interface:

a plurality of virtual storage subsystems each providing a virtual storage extent associated with said physical storage extent to said host computers and each having a first virtual storage interface and a second virtual storage interface;

a first connection unit for physically connecting said host computers and said virtual storage subsystems through the first virtual storage interfaces;

a second connection unit for physically connecting said virtual storage subsystems through the second virtual storage interfaces with the storage interfaces of said storage subsystems; and a management computer coupled to said storage subsystems, said virtual storage subsystems, said first connection unit and said second connection unit;

wherein the management computer includes performance information indicative of a utilization rate of each of the first virtual storage interfaces and logical network configuration information indicating in which logical networks each of the first virtual storage interfaces and each of the second virtual storage interfaces is included, the management computer is configured to detect when a utilization rate of a first virtual storage subsystem exceeds a threshold value based on the performance information, the management computer is further configured to select one of said host computers included in a first logical network comprising the first virtual storage interface of the first virtual storage subsystem and also to select a storage interface included in a second logical network comprising the second virtual storage interface of the first virtual storage subsystem, and the management computer is configured to search for a second virtual storage subsystem having a first virtual storage interface that is included in a third logical network comprising the selected host computer and a second virtual storage interface included in a fourth logical network comprising the selected storage interface based on the logical network configuration information, wherein said virtual storage subsystems include a migration unit for migrating a first virtual storage extent of said first virtual storage subsystem to said second virtual storage subsystem.

13. The computer system according to claim 1, wherein when the second virtual storage subsystem is not found among said plurality of virtual storage subsystems, the management computer sends a command to change said system configuration information, and wherein said first connection unit and second connection unit change their respective configurations according to the changed logical network configuration information to configure a third virtual storage subsystem having a first virtual storage interface included in the third logical network and a second virtual storage interface included in the fourth logical network.

14. The computer system according to claim 1, wherein a utilization rate of said second virtual storage subsystem is less than a threshold value and the utilization rate of said first virtual storage subsystem.

15. The computer system according to claim 14, wherein the utilization rate of said second virtual storage subsystem is the lowest utilization rate among of all of said virtual storage subsystems.

* * * * *